United States Patent
Noguchi et al.

(10) Patent No.: US 9,046,968 B2
(45) Date of Patent: Jun. 2, 2015

(54) SYSTEMS AND METHOD FOR DETECTING CONTACT WITH A DISPLAY PANEL BY ASYMETRIC DETECTION WAVEFORM

(75) Inventors: Kouji Noguchi, Kanagawa (JP); Tsutomu Harada, Aichi (JP); Yoshitoshi Kida, Aichi (JP); Takayuki Nakanishi, Aichi (JP); Koji Ishizaki, Aichi (JP); Takeya Takeuchi, Aichi (JP)

(73) Assignee: Japan Display, Inc., Tokyo (JP)

(*) Notice: Subject to any disclaimer, the term of this patent is extended or adjusted under 35 U.S.C. 154(b) by 640 days.

(21) Appl. No.: 12/794,289

(22) Filed: Jun. 4, 2010

(65) Prior Publication Data

US 2010/0328257 A1    Dec. 30, 2010

(30) Foreign Application Priority Data

Jun. 29, 2009   (JP) .................... 2009-154207

(51) Int. Cl.
*G06F 3/044* (2006.01)
*G02F 1/1333* (2006.01)

(52) U.S. Cl.
CPC ............ *G06F 3/044* (2013.01); *G02F 1/13338* (2013.01)

(58) Field of Classification Search
CPC ............ G06F 2203/04107; G06F 2203/04111; G06F 2203/04112; G06F 1/169–1/1692; G06F 2200/1634; G06F 2200/0339; G06F 2200/04103; G06F 2200/04104; G06F 3/03547; G06F 3/041–3/0416; G06F 3/0488–3/04886; H03K 17/955; H03K 17/962; G02F 1/13338
USPC ................................................ 345/173–178
See application file for complete search history.

(56) References Cited

U.S. PATENT DOCUMENTS

| | | | |
|---|---|---|---|
| 6,075,520 A * | 6/2000 | Inoue et al. ................... | 345/173 |
| 2006/0017710 A1* | 1/2006 | Lee et al. ...................... | 345/173 |
| 2007/0257890 A1 | 11/2007 | Hotelling et al. | |
| 2007/0285365 A1 | 12/2007 | Lee | |
| 2008/0158178 A1* | 7/2008 | Hotelling et al. ............. | 345/173 |
| 2008/0224971 A1 | 9/2008 | Utsunomiya et al. | |
| 2009/0102813 A1* | 4/2009 | Mamba et al. ................ | 345/174 |
| 2009/0229893 A1* | 9/2009 | Muranaka ................... | 178/20.01 |
| 2009/0267914 A1* | 10/2009 | Dews et al. ................... | 345/173 |
| 2010/0149110 A1* | 6/2010 | Gray .............................. | 345/173 |
| 2012/0162129 A1 | 6/2012 | Krah et al. | |

FOREIGN PATENT DOCUMENTS

| | | |
|---|---|---|
| CN | 101393496 A1 | 3/2009 |
| JP | 2007-334358 A | 12/2007 |
| TW | M341273 A1 | 9/2008 |

* cited by examiner

*Primary Examiner* — Sanghyuk Park
(74) *Attorney, Agent, or Firm* — Robert J. Depke; The Chicago Technology Law Group, LLC

(57) ABSTRACT

A capacitance-type touch panel, allowing disturbance noise and touch detection time to be reduced and having a simple configuration, is provided. The capacitance-type touch panel including: a plurality of drive electrodes each having a strip shape; a drive control circuit performing control such that a drive signal for touch detection is selectively applied to the drive electrodes; a plurality of touch detection electrodes arranged to intersect with the drive electrodes in such a manner that capacitance is formed in each intersecting part, and each outputting a detection signal in synchronization with the drive signal; and a detection circuit detecting an external proximity object based on the detection signal. The drive control circuit controls application of the drive signal in such a manner that the detection signal is a polarity-alternating signal including a positive-negative asymmetrical signal component which is due to presence of the external proximity object.

14 Claims, 19 Drawing Sheets

SYSTEMS AND METHOD FOR DETECTING CONTACT WITH A DISPLAY PANEL BY ASYMETRIC DETECTION WAVEFORM

The present application claims priority to Japanese Patent Application No. JP2009-154207 filed in the Japanese Patent Office on Jun. 29, 2009, the entire content of which is hereby incorporated by reference.

BACKGROUND OF THE INVENTION

1. Field of the Invention

The present invention relates to a touch panel that may be inputted with information by contact or approach of a user with a finger or the like, and particularly relates to a method of driving a touch panel detecting touch based on change in capacitance, and a touch panel and a display apparatus with a touch detection function using the method each.

2. Description of Related Art

A display device is recently noticed, in which a contact detector, so-called touch panel, is mounted on a display device such as liquid crystal display device, and various button images are displayed on the display device so as to allow information input as a substitute for typical mechanical buttons. While several types of touch panels, including an optical type and a resistance type, exist, a capacitance-type touch panel is particularly expected for a mobile terminal because of a relatively simple structure and low power consumption. However, in the case of the capacitance-type touch panel, a human body acts as an antenna receiving noise (hereinafter, called disturbance noise) caused by an inverter fluorescent lamp, an AM broadcast wave, an AC power supply and the like, and the noise may be transmitted to the touch panel, causing malfunction.

The malfunction is due to a fact that a signal on presence of touch (hereinafter, called touch signal) generated by contact or approach of a user with a finger is hardly distinguished from disturbance noise. The touch signal is typically A/D converted (sampled) by a detection circuit with folding noise being generated. Specifically, when a signal having a frequency component higher than a Nyquist frequency is sampled, the signal is folded with the Nyquist frequency as a reference, and outputted as a signal having a frequency component lower than the Nyquist frequency. Therefore, when disturbance noise having a frequency component higher than the Nyquist frequency is inputted to the detection circuit, frequency of such a noise component is equivalent to be in a frequency band equal to or lower than the Nyquist frequency. Thus, the disturbance noise is hardly distinguished from a touch signal to be normally detected in the frequency band equal to or lower than the Nyquist frequency.

Thus, for example, United States Patent Application Publication 2007/0257890 proposes a method, in which when a touch signal is detected, the touch signal being in synchronization with a signal (hereinafter, drive signal) driving a capacitance-type touch panel, a plurality of drive signals having different frequencies are used to select a condition, at which a touch signal is hardly affected by disturbance noise, for detection of the touch signal. In the method, a detection circuit uses the drive signals having different frequencies to sample a touch signal at a plurality of sampling frequencies corresponding to the drive signals, which inevitably leads to change in Nyquist frequency. That is, a folding reference is changed. Therefore, when disturbance noise having a high frequency component compared with the Nyquist frequency is inputted to the detection circuit, a frequency of a noise component equivalent to the disturbance noise, the noise component appearing in a frequency band not higher than the Nyquist frequency, is changed depending on the Nyquist frequency. In contrast, a frequency of a touch signal component is not changed even if the Nyquist frequency is changed. Therefore, the Nyquist frequency is selected such that the equivalent noise component may be distinguished from the touch signal component, so that the disturbance noise may be distinguished from the touch signal.

SUMMARY OF THE INVENTION

However, in the drive method of the capacitance-type touch panel and the detection method thereof disclosed in the above-mentioned United States Patent Application Publication, since a frequency of a drive signal needs to be sequentially changed to select a condition at which a touch signal is hardly affected by disturbance noise, much time may be taken for selecting the condition. That is, detection time may be increased. Furthermore, preparation of drive signals having a plurality of frequencies is necessary, and switching timing of the signals needs to be determined, so that a circuit configuration may be complicated and large.

As another method of removing the disturbance noise, a generally-known noise filter is considered to be used. For example, a low-pass filter having a cutoff frequency lower than the relevant Nyquist frequency is inserted before A/D conversion, thereby folding noise may be removed. Thus, the disturbance noise may be removed, and a detection circuit may be simplified after A/D conversion. However, a touch signal in synchronization with a drive signal outputted from a touch panel is a positive-negative symmetrical polarity-alternating signal and therefore may not pass through the low-pass filter. Specifically, the low-pass filter removes not only the disturbance noise but also the touch signal.

It is desirable to provide a method of driving a touch panel, in which presence of touch may be securely detected while influence of the disturbance noise and touch detection time are reduced despite using a relatively simple circuit configuration, and provide a touch panel and a display apparatus with a touch detection function using the drive method each.

A capacitance-type touch panel according to an embodiment of the invention includes a drive control circuit, a plurality of drive electrodes, a plurality of touch detection electrodes, and a detection circuit. The drive control circuit performs control such that a drive signal for touch detection is selectively applied to the drive electrodes. The drive electrodes each have a strip shape, and selectively applied with a drive signal. The touch detection electrodes are arranged to intersect with the drive electrodes in such a manner that capacitance is formed in each intersecting part, and each outputs a detection signal in synchronization with the drive signal. The detection circuit detects an external proximity object based on the detection signal. In particular, the drive control circuit controls application of the drive signal in such a manner that the detection signal comes to be a polarity-alternating signal including a positive-negative asymmetrical signal component which is due to presence of the external proximity object.

A display apparatus with a touch detection function according to an embodiment of the invention has the capacitance-type touch panel according to the embodiment of the invention. In this case, the display apparatus may be configured such that the drive signal for touch detection also serves as part of a display drive signal.

A method of driving a touch panel according to an embodiment of the invention includes the steps of: selectively applying a drive signal for touch detection to a plurality of drive electrodes each having a strip shape; allowing each of a plurality of touch detection electrodes to output a detection signal in synchronization with the drive signal when a external proximity object exists, the touch detection electrodes being arranged to intersect with the drive electrodes in such a manner that capacitance is formed in each intersecting part, and the detection signal being a polarity-alternating signal including a positive-negative asymmetrical signal component which is due to presence of a external proximity object; and detecting the external proximity object based on the detection signal.

In the method of driving a touch panel, the capacitance-type touch panel, and the display device with a touch detection function according to the embodiment of the invention, when a drive signal is selectively applied to a plurality of drive electrodes, a polarity-alternating signal, as a detection signal, in correspondence to capacitance between each drive electrode and each touch detection electrode is outputted from the touch detection electrode. At that time, when an external proximity object such as a finger exists, capacitance between a drive electrode and a touch detection electrode in a part corresponding to the object is changed, and change in waveform corresponding to such change in capacitance (touch component) appears in the detection signal. The touch component is a positive-negative asymmetrical signal component due to presence of the external proximity object. Such positive-negative asymmetry results in a phenomenon that even if signal processing of the detection signal is performed via an analog filter for noise removal, the touch component is not removed from the detection signal.

The touch component appearing in the detection signal may have positive-negative asymmetry by several methods.

In a first method, a signal, which has a periodical waveform including a period of a first voltage, and a period of a second voltage different from the first voltage, is used as a drive signal, a first group of drive electrodes and a second group of drive electrodes are selected from a plurality of drive electrodes, and the first voltage and the second voltage of the drive signal are applied to the selected drive electrodes of the first and second groups, respectively. The drive electrodes are selected in such a manner that, a total width of drive electrodes, belonging to the first group of drive electrode, within a base width corresponding to size of an external proximity object is different from a total width of drive electrodes, belonging to the second group of drive electrodes, within the base width, at any position in a region where the drive electrodes are arranged. Thus, magnitude of capacitance between the drive electrode and the touch detection electrode is different between an application period of the first voltage of the drive signal and an application period of the second voltage thereof, as a result, the touch component in the polarity-alternating detection signal becomes positive-negative asymmetrical.

In the first method, furthermore, it is preferable that all the second group of drive electrodes are discretely divided into a plurality of sub groups, and a drive signal is applied to drive electrodes of each sub group. In this case, furthermore, it is preferable that total width of all the first group of drive electrodes is equal to total width of all the second group of drive electrodes. For example, in the case that an in-cell type touch panel integrated with a display device is configured, touch detection operation is hardly affected by internal noise associated with writing to a display element.

In a second method, a signal, which has a periodical waveform including a period of a first voltage, and a period of a second voltage different from a first voltage, is used as a drive signal, a group of drive electrodes configuring a single strip region are selected from a plurality of drive electrodes, and a first voltage of the drive signal is applied to the group of drive electrodes and a second voltage is not applied to any drive electrode. In the method, a touch component appears in a detection signal only in an application period of the first voltage of the drive signal, and does not appear in an application period of the second voltage. As a result, a touch component in the polarity-alternating detection signal becomes positive-negative asymmetrical.

According to the method of driving a touch panel, the capacitance-type touch panel, and the display device with a touch detection function of the embodiment of the invention, when an external proximity object exists, a touch component included in a detection signal from a touch detection electrode has positive-negative asymmetry, therefore even if signal processing of a detection signal is performed via an analog filter for noise removal, the touch component is not removed from the detection signal. Therefore, the touch signal may be securely detected while removing disturbance noise. Moreover, since processing of sequentially changing frequency of a drive signal to select a detection condition is unnecessary unlike in the past, reduction in size of a detection circuit and decrease in detection time may be achieved.

Other and further objects, features and advantages of the invention will appear more fully from the following description.

BRIEF DESCRIPTION OF THE DRAWINGS

FIG. 20A is a perspective view showing appearance as viewed from a front side, and FIG. 20B is a perspective view showing appearance as viewed from a back side.

FIG. 23A is a front view of the example in an opened state, FIG. 23B is a side view thereof, FIG. 23C is a front view of the example in a closed state, FIG. 23D is a left-side view thereof, FIG. 23E is a right-side view thereof, FIG. 23F is a top view thereof, and FIG. 23F is a bottom view thereof.

DETAILED DESCRIPTION OF THE PREFERRED EMBODIMENTS

Figure 1:
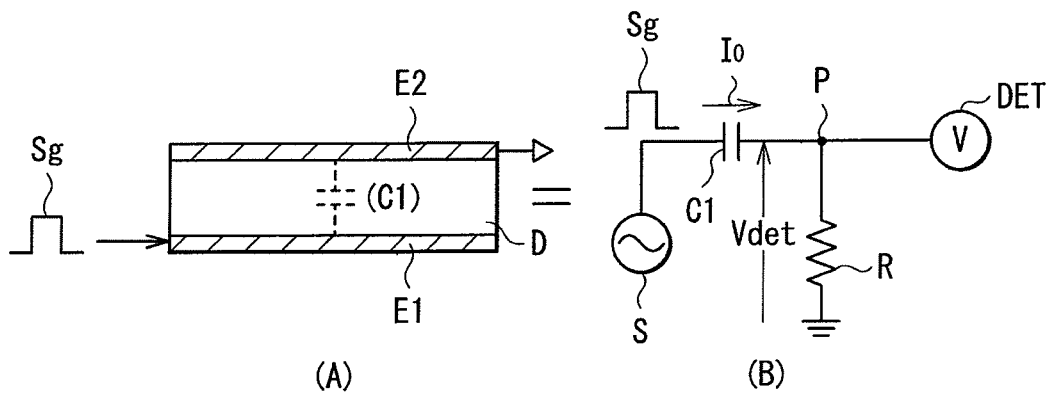
FIGS. 1A and 1B are diagrams for illustrating a principle of a touch detection method of a display apparatus with a touch detection function according to an embodiment of the invention, showing a noncontact or non-approach state of a finger.
Figure 2:
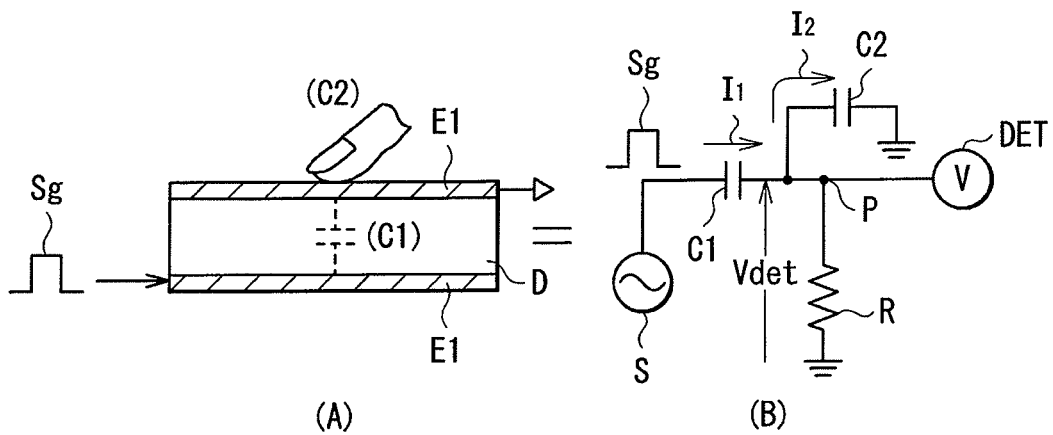
FIGS. 2A and 2B are diagrams for illustrating the principle of the touch detection method of the display apparatus with a touch detection function according to the embodiment of the invention, showing a contact or approach state of a finger.
Figure 3:
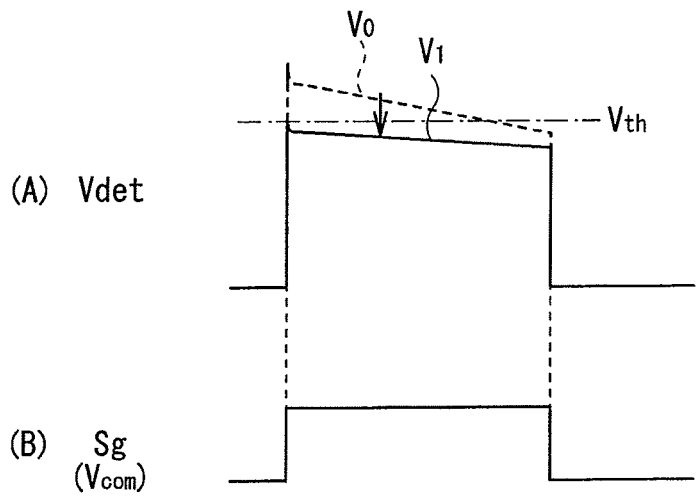
FIG. 3 is a diagram for illustrating the principle of the touch detection method of the display apparatus with a touch detection function according to the embodiment of the invention, showing an example of each waveform of a drive signal and a detection signal.

Hereinafter, preferred embodiments of the invention will be described in detail with reference to drawings. Description is made in the following sequence.
1. Principle of capacitance-type touch detection
2. First embodiment
3. Second embodiment
4. Application examples
5. Other modifications 1. Principle of Capacitance-Type Touch Detection First, a principle of a touch detection method of each of a touch panel and a display apparatus with a touch detection function according to embodiments of the invention is described with reference to FIGS. 1A and 1B to FIG. 3. The touch detection method is embodied as a capacitance-type touch sensor, in which a pair of electrodes (a drive electrode E1 and a detection electrode E2) oppositely disposed with a dielectric D in between are used to configure a capacitative element, for example, as shown in FIG. 1A. Such a structure is represented as an equivalent circuit shown in FIG. 1B. The drive electrode E1, the detection electrode E2, and the dielectric D collectively configure a capacitative element C1. One end of the capacitative element C1 is connected to an AC signal source (drive signal source) S, and the other end P thereof is grounded via a resistor R and connected to a voltage detector (detection circuit) DET. When an AC square wave Sg (part B in FIG. 3) having a predetermined frequency (for example, about several to more than ten kHz) is applied from the AC signal source S to the drive electrode E1 (one end of the capacitative element C1), an output waveform (detection signal Vdet) as shown in part A in FIG. 3 appears in the detection electrode E2 (the other end P of the capacitative element C1). The AC square wave Sg corresponds to a drive signal Vcom described later.

In a noncontact (or non-approach) state of a finger, a current I0 corresponding to a capacitance value of the capacitative element C1 flows along with charge and discharge of the capacitative element C1 as shown in FIGS. 1A and 1B. In this case, a potential waveform at the other end P of the capacitative element C1 is, for example, similar to a waveform V0 in part A in FIG. 3, which is detected by the voltage detector DET.

In contrast, in a contact (or approach) state of a finger, a capacitative element C2 formed by the finger is added in series to the capacitative element C1 as shown in FIGS. 2A and 2B. In this state, a current I1 and I2 flows with charge and discharge of the capacitative element C1 or C2, respectively. In this case, a potential waveform at the other end P of the capacitative element C1 is, for example, similar to a waveform V1 in part A in FIG. 3, which is detected by the voltage detector DET. At that time, a potential of a point P becomes a divided potential determined by values of the currents I1 and I2 flowing through the respective capacitance elements C1 and C2. Therefore, the waveform V1 has a small value compared with a value of the waveform V0 in the noncontact state. The voltage detector DET compares a detected voltage to a predetermined threshold voltage Vth. When the detected voltage is equal to or higher than the threshold voltage, the voltage detector determines the state as a noncontact state, and when the detected voltage is lower than the threshold voltage, the voltage detector determines the state as a contact state. In this way, touch detection is enabled.

2. First Embodiment

Configuration Example
General Configuration Example

Figure 4:
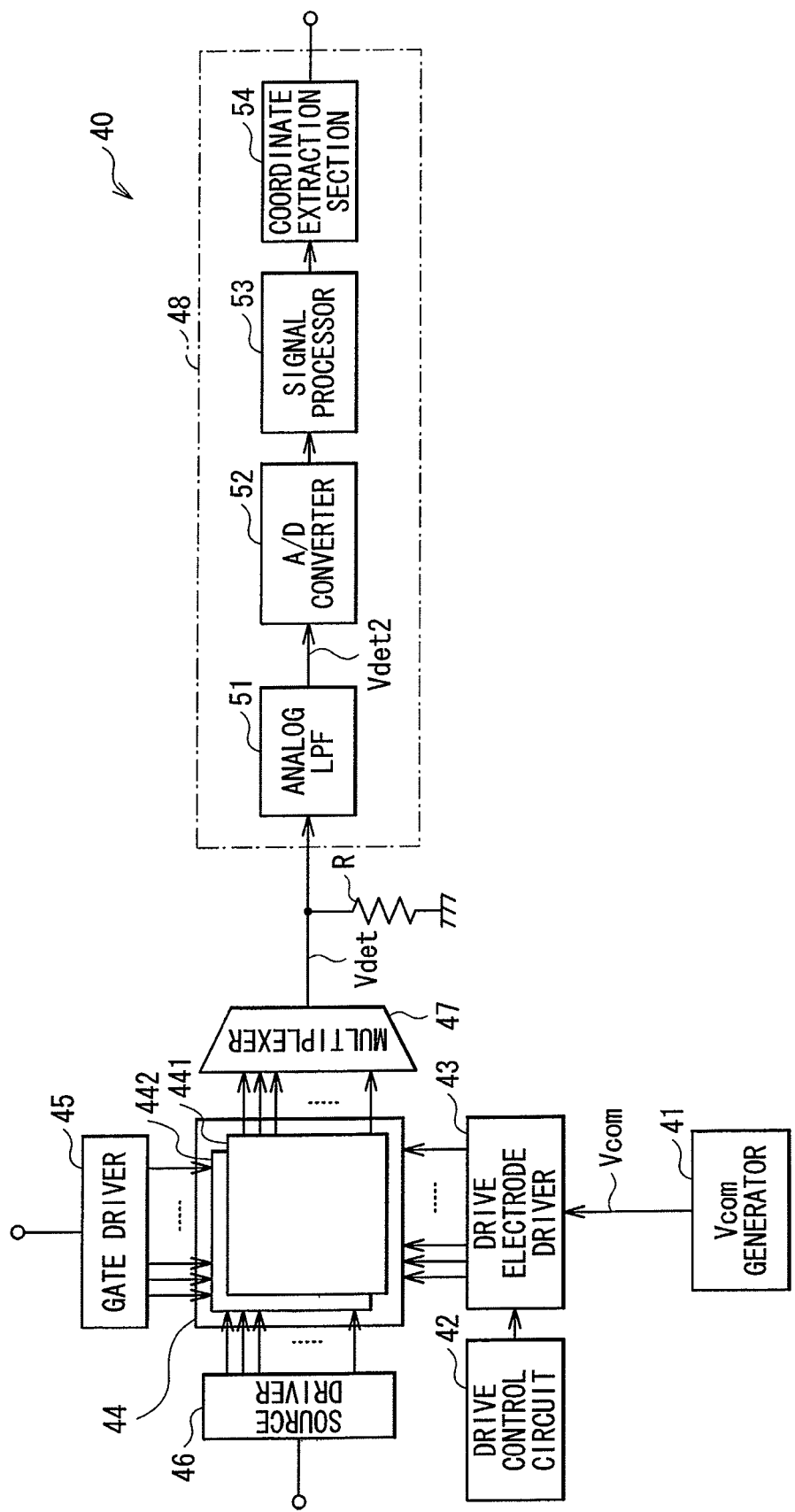
FIG. 4 is a block diagram showing a configuration example of a display apparatus with a touch detection function according to a first embodiment of the invention.

FIG. 4 shows a configuration example of a display apparatus with a touch detection function according to a first embodiment of the invention. Since a method of driving a touch panel according to an embodiment of the invention is embodied by the embodiment, the method is described together. The display apparatus is a so-called in-cell type apparatus where liquid crystal display elements are used as display elements, and besides, a liquid crystal display device configured of the liquid crystal display elements is integrated with a capacitance-type touch sensor.

The display apparatus with a touch detection function 40 includes a Vcom generator 41, a drive control circuit 42, a drive electrode driver 43, a display device with a touch detection function 44, a gate driver 45, a source driver 46, a multiplexer 47, a detection circuit 48, and a resistance R.

The Vcom generator 41 is a circuit generating a drive signal Vcom used in the display device with a touch detection function 44. Here, the drive signal Vcom is a polarity-alternating square wave as shown in part A in FIG. 9 described later, and therefore has a positive range (period of a first voltage) and a negative range (period of a second voltage). Specifically, each liquid crystal display element of the embodiment is driven by a so-called polarity-reversal drive method in which a polarity of an applied voltage to a liquid crystal element is reversed every one horizontal pixel line (1H).

The drive electrode control section 42 selects and controls an electrode of a plurality of drive electrodes of the display device 44 when the drive signal Vcom supplied from the Vcom generator 41 is supplied to the electrodes. At that time, the drive electrode control section 42 may control a layout, number and scan-movement of drive electrodes to be applied with the drive signal Vcom depending on polarity (positive or negative polarity) of the drive signal Vcom. In particular, the drive electrode control section 42 of the embodiment may perform control of changing a layout pattern of drive electrodes to be applied with the drive signal Vcom between the positive and negative ranges of the drive signal Vcom while number of drive electrodes to be applied with the drive signal Vcom is kept to a certain number in each of the positive and negative ranges.

The drive electrode driver 43 is a circuit supplying the drive signal Vcom supplied from the Vcom generator 41 to the drive electrodes of the display device with a touch detection function 44 described later according to a control signal from the drive control circuit 42.

The display device with a touch detection function 44 has a touch sensor 441 and a liquid crystal display device 442. The touch sensor 441 outputs a detection signal Vdet having a waveform, for example, as shown in part B and part C in FIG. 9 based on the principle of capacitance-type touch detection. The detection signal Vdet includes a signal component due to touch operation (hereinafter, called "touch component") as will be described later.

The gate driver 45 is a circuit supplying a signal for selecting a horizontal pixel line to be displayed to the liquid crystal display device 442. The source driver 46 is a circuit supplying an image signal to the liquid crystal display device 442. The multiplexer 47 is a circuit where whenever the detection signal Vdet is sequentially extracted from a plurality of touch detection electrodes (described later) of the touch sensor 441, the circuit switches a source of such extraction.

The detection circuit 48 detects presence of touch to the touch sensor 441 based on the detection signal Vdet switched by the multiplexer 47, and furthermore obtains coordinates of a touch point on a touch panel. The detection circuit 48 includes analog LPF (Low-Pass Filter) 51, an A/D converter 52, a signal processor 53, and a coordinate extraction section 54. The analog LPF 51 is a low-pass analog filter that removes a high frequency component from the detection signal Vdet, and then outputs such a processed signal. The analog LPF 51 is inserted to remove folding noise generated in the A/D converter 52 described later. The A/D converter 52 is a circuit converting an analog signal outputted from the analog LPF 51 into a digital signal. The signal processor 53 is a logic circuit detecting presence of touch to the touch sensor 441 based on an output signal from the A/D converter 52. The coordinate extraction section 54 is a logic circuit obtaining coordinates on the touch panel at which presence of touch is detected by the signal processor 53.

These circuits are controlled by a not-shown timing controller.

Configuration example of display device with a touch detection function 44

Figure 5:
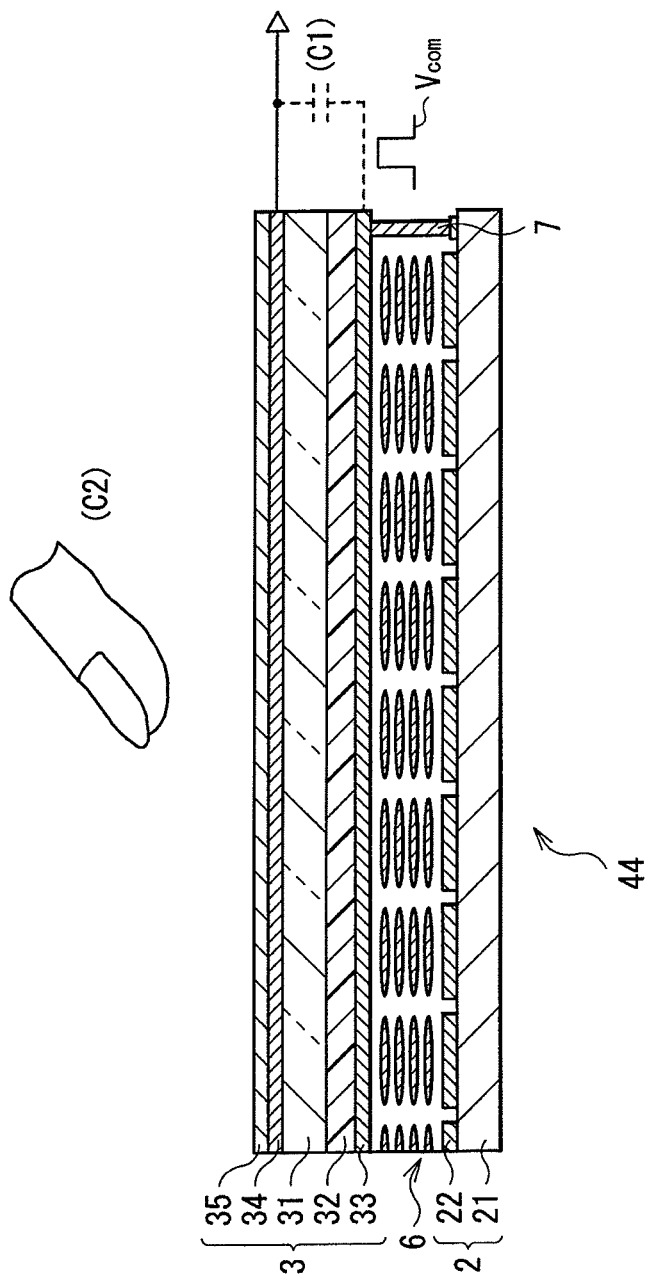
FIG. 5 is a section diagram showing a schematic section structure of a display device with a touch detection function shown in FIG. 4.

FIG. 5 shows an example of a relevant-part section structure of the display device with a touch detection function 44. The display device 44 includes a pixel substrate 2, a counter substrate 3 disposed facing the pixel substrate 2, and a liquid crystal layer 6 inserted between the pixel substrate 2 and the counter substrate 3.

The pixel substrate 2 has a TFT substrate 21 as a circuit board, and a plurality of pixel electrodes 22 arranged in a matrix pattern on the TFT substrate 21. TFT (Thin Film Transistor) of each pixel, and wirings such as a source line supplying an image signal to each pixel electrode and a gate line driving each TFT, which are not shown, are formed on the TFT substrate 21. In addition, the TFT substrate 21 may be formed including part or all of the circuit shown in FIG. 4.

The counter substrate 3 has a glass substrate 31, a color filter 32 formed on one surface of the glass substrate 31, and a drive electrode 33 formed on the color filter 32. The color filter 32 includes, for example, color filter layers of three colors of red (R), green (G) and blue (B) being periodically arranged, where a set of RGB three-color filters is set in correspondence to each display pixel. The drive electrode 33 acts as a common drive electrode of the liquid crystal display device 442, and besides, shared as a drive electrode of the touch sensor 441. The drive electrode 33 is connected to the TFT substrate 21 by a contact conduction pole 7. The drive signal Vcom having an AC square waveform is applied from the TFT substrate 21 to the drive electrode 33 via the contact conduction pole 7. The drive signal Vcom, which may be called common drive signal, defines a pixel voltage applied to the pixel electrode 22 and a display voltage of each pixel. Furthermore, the drive signal Vcom is used even as a drive signal of the touch sensor.

A touch detection electrode 34 as a detection electrode of the touch sensor 441 is formed on the other surface of the glass substrate 31, and furthermore, a polarizing plate 35 is disposed on the touch detection electrode 34.

The liquid crystal layer 6 modulates light passing through the liquid crystal layer 6 depending on a state of an electric field. Various modes of liquid crystal are used for the liquid crystal layer 6, the modes including a TN (Twisted Nematic) mode, a VA (Vertical Alignment) mode, an ECB (Electric-Field Control Birefringence) mode and the like.

An alignment film is disposed between the liquid crystal layer 6 and the pixel substrate 2, and between the liquid crystal layer 6 and the counter substrate 3, respectively, and an incidence-side polarizing plate is disposed on a bottom side of the pixel substrate 2, each of which is omitted to be shown here.

Figure 6:
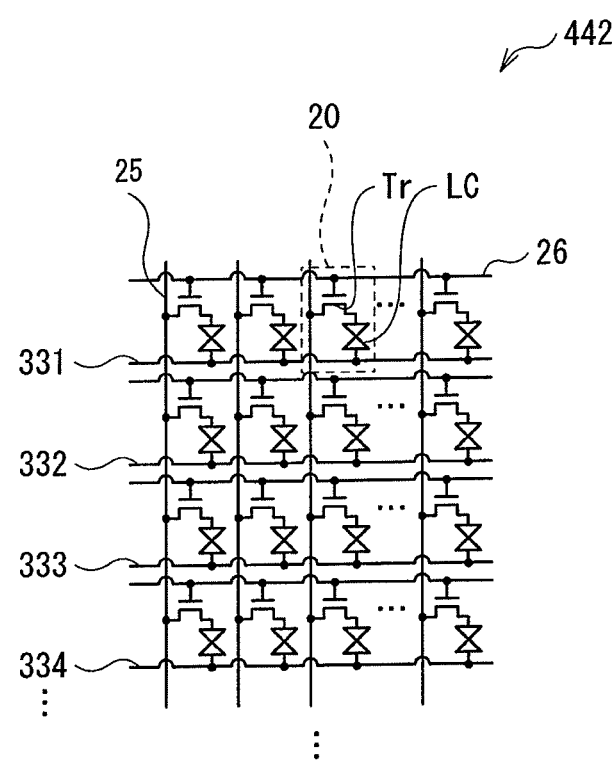
FIG. 6 is a circuit diagram showing pixel arrangement of the liquid crystal display device shown in FIG. 4.

FIG. 6 shows a configuration example of a pixel structure of the liquid crystal display device 442. In the liquid crystal display device 442, a plurality of display pixels 20, each display pixel having a TFT element Tr and a liquid crystal element LC, are arranged in a matrix pattern.

Each display pixel 20 is connected with a source line 25, a gate line 26, and the drive electrode 33 (here, for example, n electrodes 331 to 33n (n: an integer of 2 or more)). The source line 25 is a signal line for supplying an image signal to each display pixel 20, and connected to the source driver 46. The gate line 26 is a signal line for supplying a signal selecting a display pixel 20 for display, and connected to the gate driver 45. In this example, each gate line 26 is connected to all display pixels 20 being horizontally arranged. That is, the liquid crystal display device 442 displays an image for each horizontal pixel line according to a control signal of each gate line 26. The drive electrode 33 applies a drive signal for driving the liquid crystal, and connected to the drive electrode driver 43. In the example, each drive electrode is connected to all display pixels 20 being horizontally arranged. That is, the liquid crystal display device 442 is driven for each horizontal pixel line according to a drive signal of each drive electrode.

Figure 7:
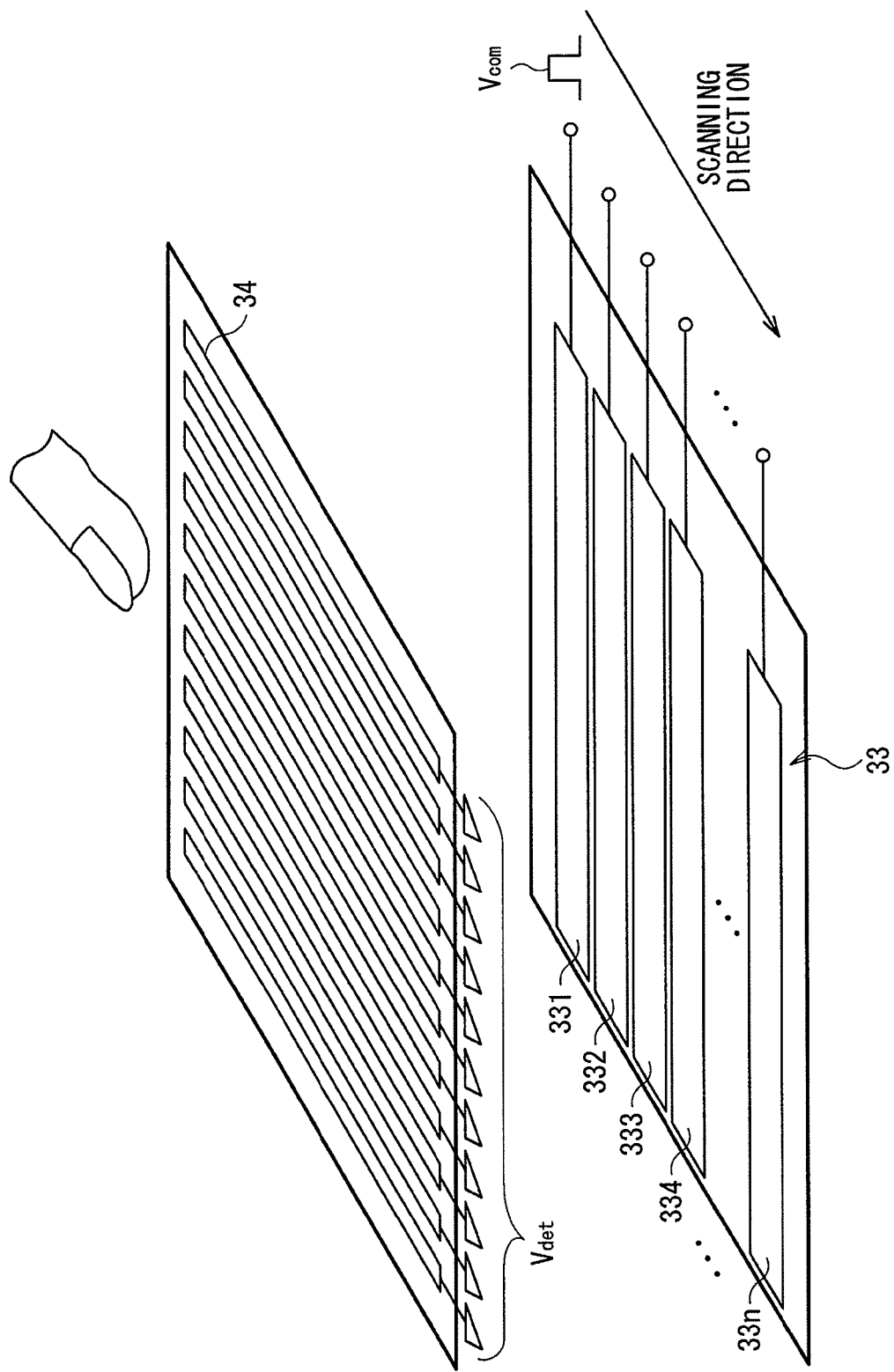
FIG. 7 is a perspective diagram showing a configuration example of drive electrodes and touch detection electrodes of the touch sensor shown in FIG. 4.

FIG. 7 perspectively shows a configuration example of the drive electrode 33 (331 to 33n) and the touch detection electrode 34 of the counter substrate 3 in the touch sensor 441. The drive electrode 33 is divided into a plurality of stripe electrode patterns extending in a horizontal direction in the figure. Each electrode pattern is sequentially supplied with the drive signal Vcom (part A in FIG. 9) by the drive electrode driver 43, so that line-sequential scan drive is time-divisionally performed as will be described later. In contrast, the touch detection electrode 34 includes a plurality of stripe electrode patterns extending in a direction orthogonal to the extending direction of the electrode patterns of the drive electrode 33. Each of the electrode patterns of the touch detection electrode 34 outputs a detection signal Vdet (part B and part C in FIG. 9), and the detection signal is inputted to the detection circuit 48 via the multiplexer 47.

The electrode patterns intersecting with each other formed by the drive electrode 33 and the touch detection electrode 34 form capacitance at each of the intersecting parts. The drive electrode 33 corresponds to the drive electrode E1 shown in FIGS. 1A and 1B and FIGS. 2A and 2B for illustrating the principle of capacitance-type touch detection. On the other hand, the touch detection electrode 34 corresponds to the detection electrode E2 shown in FIGS. 1A and 1B and FIGS. 2A and 2B. Thus, the touch sensor may detect touch in accordance with the principle of capacitance-type touch detection. Furthermore, the touch sensor is configured in a matrix pattern by the electrode patterns intersecting with each other. Therefore, a position where contact or approach of an object occurs may be detected.

Operation and Effects
General Basic-Operation

First, general operation of the display apparatus with a touch detection function 40 of the embodiment is described.

The Vcom generator 41 generates a drive signal Vcom, and supplies the signal to the drive electrode driver 43. The drive electrode driver 43 supplies the drive signal Vcom to the drive electrodes 331 to 33n of the display device with a touch detection function 44 while sequentially switching the drive electrodes according to a control signal from the drive control circuit 42. The drive control circuit 42 performs control such that a drive electrode supplying the drive signal Vcom is selected from the drive electrodes 331 to 33n in accordance with a voltage level of the drive signal Vcom. Such selection is separately performed (performed as separate selection process) for the touch sensor 441 and for the liquid crystal display device 442.

Each touch detection electrode 34 of the touch sensor 441 outputs a detection signal Vdet with a waveform having rising and falling in synchronization with voltage change timing of the drive signal Vcom based on the principle of capacitance-type touch detection. The multiplexer 47 successively extracts the detection signal Vdet outputted from each touch detection electrode 34 of the touch sensor 441 by sequentially switching an extraction source, and sends the signal to the detection circuit 48. In the detection circuit 48, the analog LPF 51 removes a high-frequency component from the detection signal Vdet, and outputs the signal as a detection signal Vdet2. The A/D converter 52 converts the detection signal Vdet2 from the analog LPF 51 into a digital signal. The signal processor 53 determines presence of touch to the touch sensor 441 by logical operation based on an output signal from the A/D converter 52. The coordinate extraction section 54 detects coordinates of a touch point on the touch sensor based on a touch detection result by the signal processor 53. In this way, when a user touches the touch panel, a position of the relevant touch is detected.

The source driver 46 supplies an image signal to the liquid crystal display device 442. The gate driver 45 supplies a selection signal (gate signal) for selecting a horizontal pixel line to be displayed to the liquid crystal display device 442. In the liquid crystal display device 442, the whole screen is line-sequentially scanned for each horizontal pixel line based on the image signal, the gate signal and a drive signal, so that an image is displayed on the screen. More particularly, in FIG. 6, a pixel signal is supplied via a source line 25 and then applied to a pixel electrode 22 of the liquid crystal element LC via a TFT element Tr of a line-sequentially selected display pixel 20 by the gate line 26, and the polarity-alternating drive signal Vcom (part A in FIG. 9) is applied to the common electrode (drive electrode 33). Thus, pixel data are written into the liquid crystal element LC for image display.

Next, features of the embodiment are described in detail.
Operation example of drive control circuit 42

The drive control circuit 42 selects a drive electrode, to which the drive signal Vcom is applied by the drive electrode driver 43, from the drive electrodes 33 of the display device with a touch detection function 44. Such selection is separately performed for the touch sensor 441 and for the liquid crystal display device 442.

Figure 8:
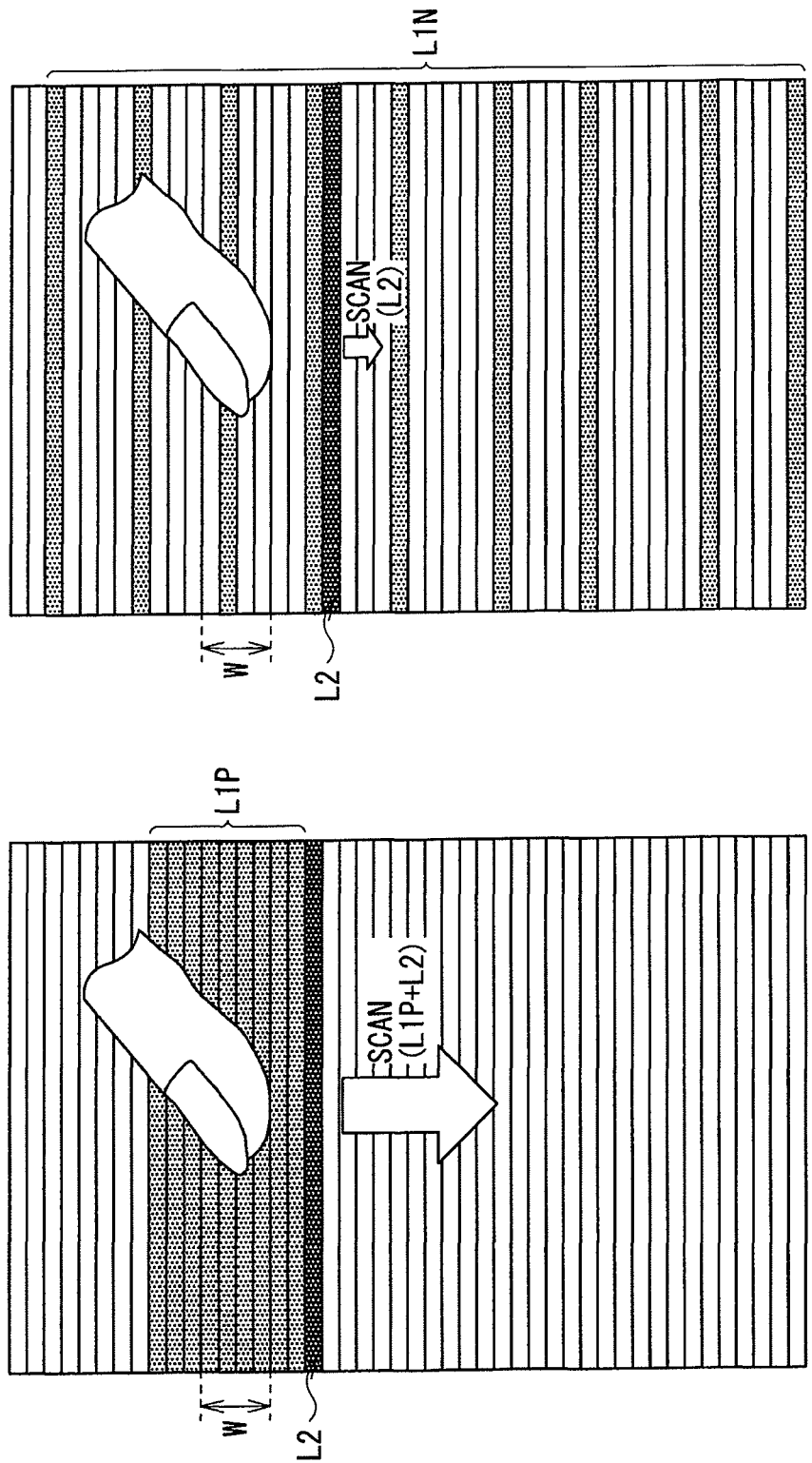
FIGS. 8A and 8B are schematic diagrams showing an example of a selection state of a drive electrode according to the display device with a touch detection function shown in FIG. 4.

FIGS. 8A and 8B show an operation example of a drive electrode applied with the drive signal Vcom, where FIG. 8A shows an operation example when a voltage of the drive signal Vcom has a high level, and FIG. 8B shows an operation example when a voltage of the drive signal Vcom has a low level, as an operation example immediately after operation of FIG. 8A.

In FIGS. 8A and 8B, a drive electrode applied with a drive signal Vcom used for driving the touch sensor 441 is divided into a detection drive line group L1P (first group) applied with a first voltage in a positive range, and a detection drive line group lAN (second group) applied with a second voltage in a negative range. The detection drive line group UP includes continuously adjacent, a series of drive electrodes, collectively forming a single, thick strip drive electrode. In contrast, the detection drive line group L1N includes a plurality of drive electrodes dispersed one by one over the whole panel surface. Thus, wherever a proximity object such as a finger is on the touch sensor 441, number of drive electrodes in a region where the proximity object overlaps with the detection drive line group L1P is different from number of drive electrodes in a region where the proximity object overlaps with the detection drive line group L1N. In other words, total width W1 of the first group of the drive electrodes in a base width W corresponding to size of the proximity object is different from total width W2 of the second group of the drive electrodes in the base width W, and W1>W2 is given in the shown example. On the other hand, a drive electrode applied with the drive signal Vcom used for driving the liquid crystal display device 442 includes a single display drive line L2 in each of the positive and negative ranges. In the embodiment, total number of the drive electrodes is the same between the first and second groups.

As shown in FIGS. 8A and 8B, the display drive line L2 is sequentially scan-moved over the whole surface of the liquid crystal display device 442 in synchronization with polarity alternation of the drive signal Vcom. Specifically, the display drive line L2 is alternately applied with a positive voltage (first voltage) and a negative voltage (second voltage) for each movement by one horizontal pixel line. Furthermore, the gate driver 45 sequentially scans the same horizontal pixel line in synchronization with the display drive line L2. Thus, an image signal is supplied from the source line 25 to a selected, horizontal pixel line so that data are written to each pixel of the horizontal image line. Such operation is line-sequentially repeated, thereby an image is displayed on the liquid crystal display device 442.

In drive of the touch sensor 441, as shown in FIGS. 8A and 8B, number of drive electrodes applied with the drive signal Vcom or a layout pattern thereof is different depending on polarity ranges of the drive signal Vcom. Specifically, in the positive range of the drive signal Vcom, as shown in FIG. 8A, the detection drive line group L1P, which configures a single, thick strip drive electrode, is selected, and applied with the positive voltage (first voltage). The single strip drive electrode is sequentially scan-moved by one horizontal pixel line in synchronization with the display drive line L2. Such scan is performed to detect a position at which a finger contacts or approaches the touch sensor 441. In contrast, in the negative range of the drive signal Vcom, as shown in FIG. 8B, the detection drive line group L1N including dispersed drive electrodes is selected, and the drive electrodes are collectively applied with the negative voltage (second voltage).

Operation example of touch sensor 441

Next, operation example of the touch sensor 441 is described in more detail.

Figure 9:
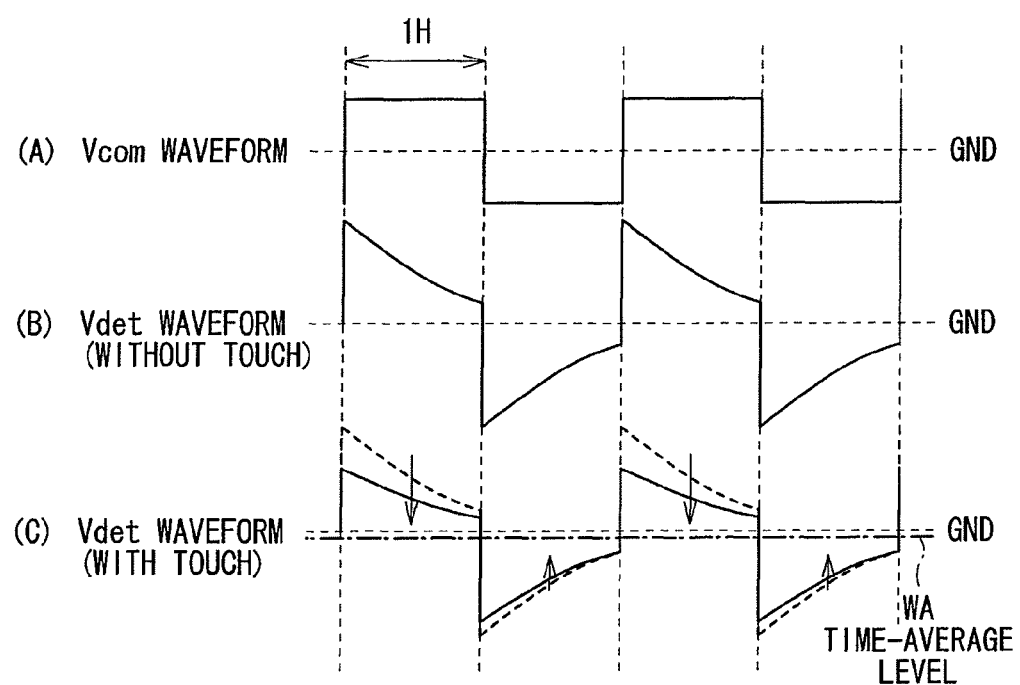
FIG. 9 is a timing chart for illustrating operation of the display apparatus with a touch detection function shown in FIG. 4.

FIG. 9A shows an example of timing of the display apparatus with a touch detection function 40, where part A in FIG. 9 shows a waveform of the drive signal Vcom, part B in FIG. 9 shows a waveform of the detection signal Vdet when touch operation is not performed, and part C in FIG. 9 shows a waveform of the detection signal Vdet when touch operation is performed. Part B and part C in FIG. 9 show an example of a detection waveform for one of the touch detection electrodes 34. In a so-called in-cell type apparatus, in which the touch sensor is integrated with the display device as in the embodiment, internal noise generated in the liquid crystal display device 442 may appear in the detection signal Vdet as output of the touch sensor 441 as described later. Thus, description is separately made for the case with internal noise and for the case without internal noise.

(1) Operation in the Case without Internal Noise

As shown in part B in FIG. 9, a waveform of the detection signal Vdet in the case that touch operation is not performed is a positive-negative symmetrical signal waveform in synchronization with polarity alternation of the drive signal Vcom. This is because total number of drive electrodes to be a drive object is not different between the positive range (detection drive line group L1P) of the drive signal Vcom and the negative range (detection drive line group L1N) thereof, as shown in FIGS. 8A and 8B. That is, when a particular touch detection electrode is noticed, capacitance of an intersecting part between the touch detection electrode and the detection drive line group L1P is equal to capacitance of an intersecting part between the same touch detection electrode and the detection drive line group L1N, and therefore an equivalent circuit of FIG. 1B is also not changed by polarity-alternating operation of the drive signal Vcom.

In this way, in the state where touch operation is not performed, a time-average level of the detection signal Vdet is approximately corresponding to a center voltage of the waveform of the detection signal Vdet due to the positive-negative symmetry of the detection signal Vdet.

In contrast, as shown in part C in FIG. 9, a waveform of the detection signal Vdet in the case that touch operation is performed is a positive-negative asymmetrical signal waveform in synchronization with polarity alternation of the drive signal Vcom. This is because when a finger contacts or approaches the touch sensor 441, overlapping area between the finger and the detection drive line group LIP is different from overlapping area between the finger and the detection drive line group L1N as shown in FIGS. 8A and 8B. That is, in the positive range of the drive signal Vcom, such overlapping area is large, so that change in capacitance due to presence of touch operation is large, and therefore a degree of decrease in amplitude of the detection signal Vdet is increased compared with the case that touch operation is not performed. In contrast, in the negative range of the drive signal Vcom, such overlapping area is small, so that change in capacitance due to presence of touch is small, and therefore a degree of decrease in amplitude of the detection signal Vdet is reduced compared with the case that touch operation is not performed.

In the state where touch operation is performed, a time-average level of the detection signal Vdet is shifted to a low voltage side (negative side) with respect to the center voltage of the waveform of the detection signal Vdet due to the positive-negative asymmetry of the detection signal Vdet. Frequency of occurrence of a section shifted to the low voltage side is sufficiently low, and the frequency directly passes through the analog LPF in a later stage. Therefore, only such a low-frequency component may be extracted, and presence of touch operation may be thus detected.

Figure 10A:
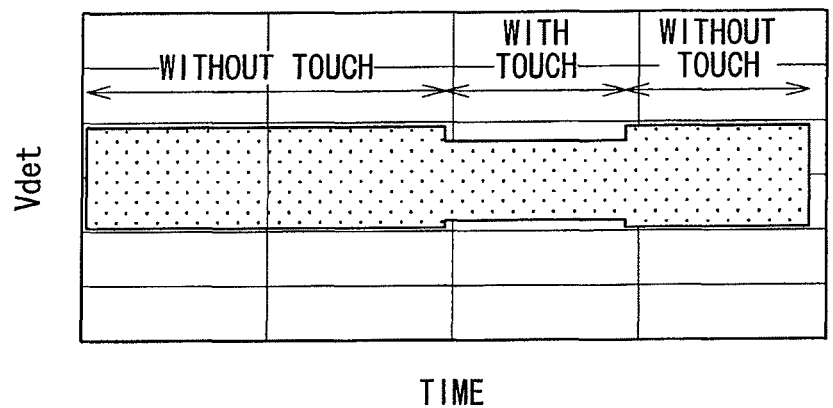
FIGS. 10A and 10B are charts showing an example of waveforms in a long time scale in the display apparatus with a touch detection function shown in FIG. 4.
Figure 10B:
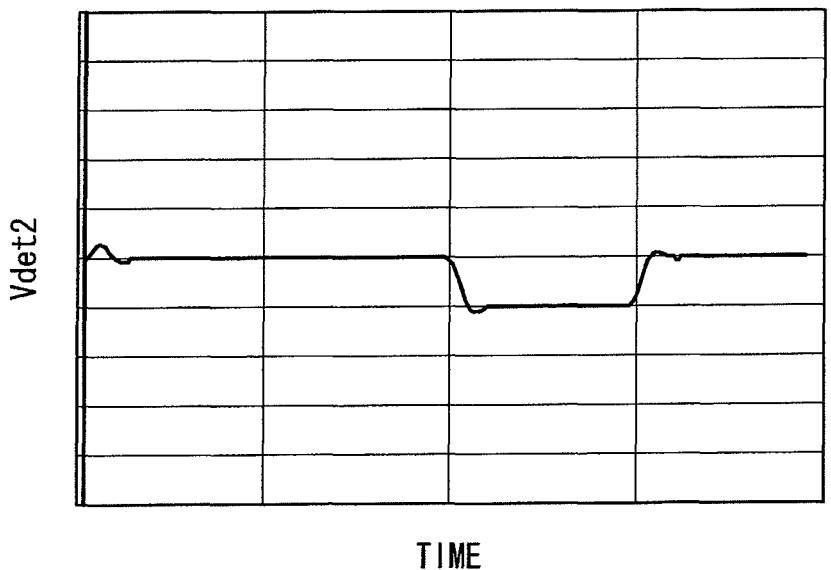

FIGS. 10A and 10B show a waveform example in a longer time scale, where FIG. 10A shows a waveform of the detection signal Vdet, and FIG. 10B shows a waveform of the detection signal Vdet2 outputted from the analog LPF 51. As known from FIG. 10A, in a period of touch operation, an upper envelope level of the waveform of the detection signal Vdet is more reduced due to the positive-negative asymmetry of the detection signal Vdet. When this waveform is inputted to the analog LPF 51, a high-frequency component is removed from the waveform, and a touch detection signal corresponding to presence of touch appears in output of the LPF 51 as shown in FIG. 10B.

The reason why the detection signal Vdet2 as in FIG. 10B appears in output of the analog LPF 51 is because positive-negative symmetry of the detection signal Vdet is changed between the case that touch operation is performed and the case that touch operation is not performed as illustrated in part B and part C in FIG. 9. Therefore, even if amplitude of the detection signal Vdet is changed between the case that touch operation is performed and the case that touch operation is not performed, a signal as shown in FIG. 10B does not appear in output of the analog LPF 51 as long as the waveform of the detection signal Vdet is positive-negative symmetric. This means that internal noise that may be in positive-negative symmetrical is also removed by the analog LPF 51 as described later.

The display apparatus with a touch detection function 40 converts the waveform of the detection signal Vdet2 shown in FIG. 10B into a digital signal by the A/D converter 52. A cutoff frequency of the analog LPF 51 is desirably set low to the utmost as long as a low-frequency signal component (FIG. 10B) generated by contact or approach of a user with a finger may pass through the LPF. If the cutoff frequency is set low compared with a Nyquist frequency calculated from a sampling frequency of the A/D converter 52, folding noise is removed. Thus, the display apparatus 40 may extremely reduce influence of disturbance noise having a frequency component equal to or higher than the Nyquist frequency.

(2) Operation in the Case with Internal Noise

Next, influence of internal noise generated by the liquid crystal display device 442 on the touch sensor 441 is described.

As above, when a gate signal is applied to a gate line 26 of a particular horizontal pixel line of the liquid crystal display device 442, a pixel electrode 22 of a liquid crystal display element LC on the horizontal pixel line is supplied with a pixel signal applied from the source line 25, and a common electrode (drive electrode 33) is supplied with the drive signal Vcom. Thus, information of the pixel on the horizontal pixel line is displayed. In this writing, a signal on the source line 25 may be transmitted to the drive electrode 33, and furthermore, appears as internal noise in the detection signal Vdet as output of the touch sensor 441. In particular, the internal noise is significantly increased in the case that all pixel signals on the relevant horizontal pixel line (namely, image signals transmitted through all source lines 25 at the relevant writing timing) have large voltage amplitude (specifically, in the case that white or black information is written into all pixels on the relevant horizontal pixel line).

Figure 11:
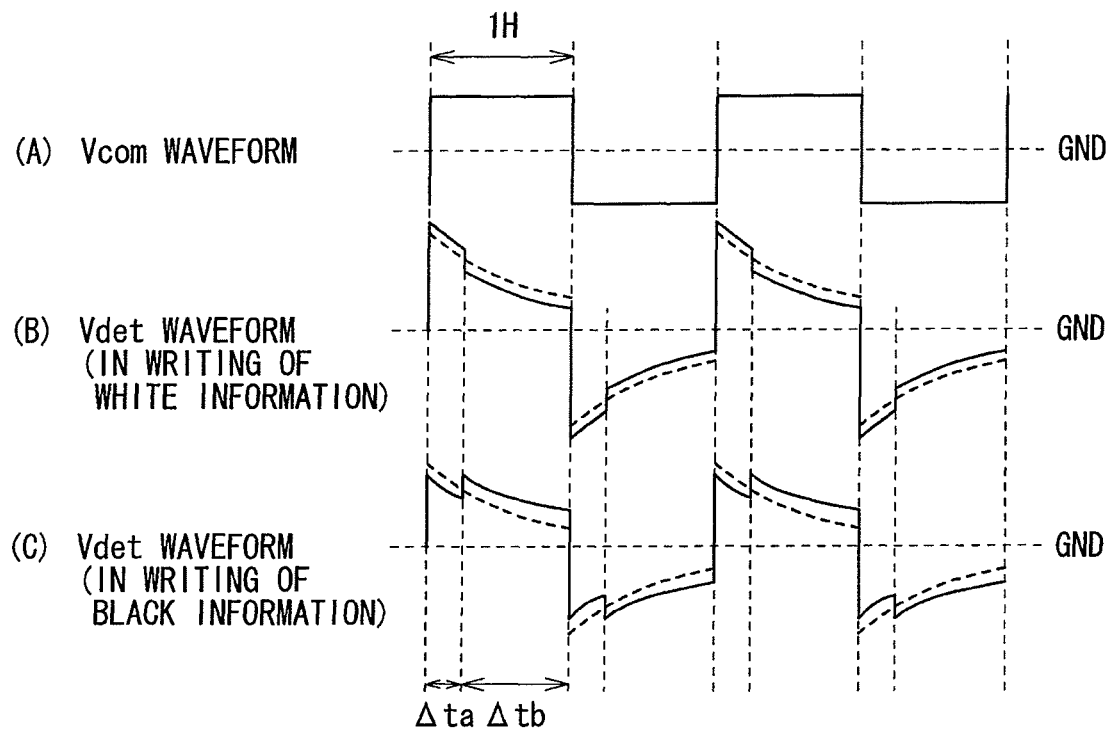
FIG. 11 is a chart showing an example of timing in the case with internal noise when touch operation is not performed in the display apparatus with a touch detection function shown in FIG. 4.

FIG. 11 shows an example of waveforms in the case that touch operation is not performed when internal noise exists, where part A in FIG. 11 shows a waveform of the drive signal Vcom, part B in FIG. 11 shows a waveform of the detection signal Vdet in writing of white information, and part C in FIG. 11 shows a waveform of the detection signal Vdet in writing of black information. Here, Δta indicates time of writing no information into a pixel, and Δtb indicates time of writing information into a pixel.

As shown in part B and part C in FIG. 11, when a pixel is written with a signal, internal noise due to the written pixel signal appears in the detection signal Vdet. At that time, magnitude of the internal noise depends on magnitude of the written pixel signal (display luminance or display color). However, a waveform of the detection signal Vdet is a positive-negative symmetrical waveform in synchronization with polarity alternation of the drive signal Vcom. This is because of the same reason as in operation of the touch sensor 441 in the case without the internal noise as shown in part B in FIG. 9. That is, this is because total number of drive electrodes applied with the drive signal Vcom is not different between the positive range and the negative range of the drive signal Vcom.

In this way, in the state where touch operation is not performed, a time-average level of the detection signal Vdet is approximately corresponding to a center voltage of the waveform of the detection signal Vdet due to the positive-negative symmetry of the detection signal Vdet.

Figure 12:
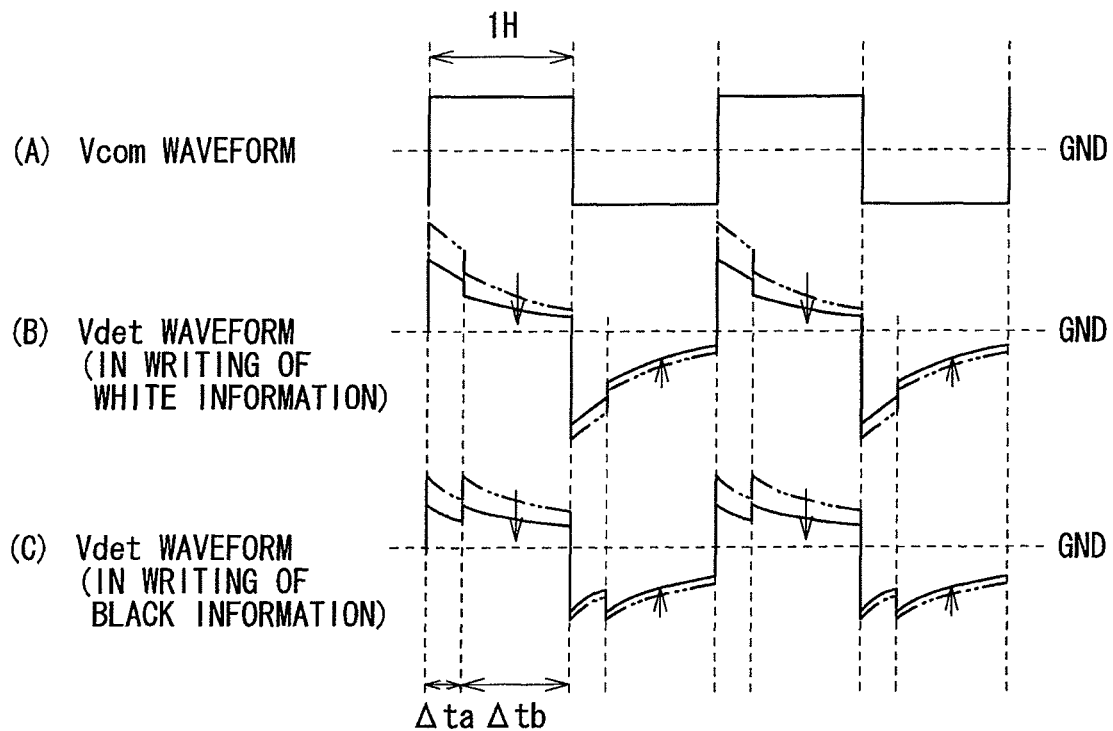
FIG. 12 is a chart showing an example of timing in the case with internal noise when touch operation is performed in the display apparatus with a touch detection function shown in FIG. 4.

FIG. 12 shows an example of waveforms in the case that touch operation is performed when internal noise exists, where part A in FIG. 12 shows a waveform of the drive signal Vcom, part B in FIG. 12 shows a waveform of the detection signal Vdet in writing of white information, and part C in FIG. 12 shows a waveform of the detection signal Vdet in writing of black information. Here, Δta and Δtb have the same meaning as in the case of FIG. 11A, respectively.

As shown in part B and part C in FIG. 12, a waveform of the detection signal Vdet in the case that touch operation is performed is a positive-negative asymmetrical waveform in synchronization with polarity alternation of the drive signal Vcom. This is because of the same reason as in operation of the touch sensor 441 in the case without internal noise as shown in part C in FIG. 9. That is, in the positive range of the drive signal Vcom, the relevant overlapping area is large, so that change in capacitance due to presence of touch operation is large, and therefore a degree of decrease in amplitude of the detection signal Vdet is increased compared with the case that touch operation is not performed. In contrast, in the negative range of the drive signal Vcom, the relevant overlapping area is small, so that change in capacitance due to presence of touch operation is small, and therefore a degree of decrease in amplitude of the detection signal Vdet is reduced compared with the case that touch operation is not performed.

In the touch operation state, a time-average level of the detection signal Vdet is shifted to a low voltage side (negative side) with respect to the center voltage of the waveform of the detection signal Vdet due to the positive-negative asymmetry of the detection signal Vdet. Frequency of occurrence of a section shifted to the low voltage side is sufficiently low, and the frequency directly passes through the analog LPF in a later stage. Therefore, only such a low-frequency component may be extracted, and presence of touch operation may be thus detected.

Advantage

As above, in the embodiment, since the drive control circuit 42 selects the drive electrodes to be added with the drive signal Vcom in a different way (with number or a position being changed) in accordance with a voltage level (polarity) of the drive signal Vcom as shown in FIGS. 8A and 8B, the detection signal Vdet from the touch sensor 441 includes a positive-negative symmetrical signal component due to transition of a voltage level of a drive signal, and a positive-negative asymmetrical signal component (touch component) due to touch operation. Therefore, even if an analog LPF is provided in a stage after the touch sensor, the touch component is not cancelled, and a touch detection signal in correspondence to presence of touch may be extracted.

Furthermore, in the embodiment, number of drive voltages added with the drive signal Vcom does not depend on a voltage level of the drive signal Vcom (in each of the positive and negative ranges), and is the same at any time, therefore influence of internal noise associated with display operation may be avoided.

Moreover, since frequency of a drive signal need not be sequentially switched for selection of a detection condition unlike in the past, detection time may be reduced, and besides, a circuit is not complicated, reduction in size of an apparatus may be achieved.

Furthermore, a cutoff frequency of the analog LPF is set low compared with the Nyquist frequency, thereby a disturbance noise component having a frequency higher than the Nyquist frequency may be reduced, and besides, a frequency band of a signal is limited to a low band. Thus, the A/D converter and the signal processor are simplified, and consequently circuit size may be further reduced.

Modification of First Embodiment

Modification 1-1

In the embodiment, when a voltage of the drive signal Vcom is positive (high level), the detection drive line group L1P is selected as in FIG. 8A, and when the voltage is negative (low level), the detection drive line group L1N is selected as in FIG. 8B. However, opposite setting may be used. Specifically, it may be designed that when a voltage of the drive signal Vcom is negative (low level), a detection drive line group is selected as in FIG. 8A, and when the voltage is positive (high level), a detection drive line group is selected as in FIG. 8B.

Modification 1-2

Figure 13B:
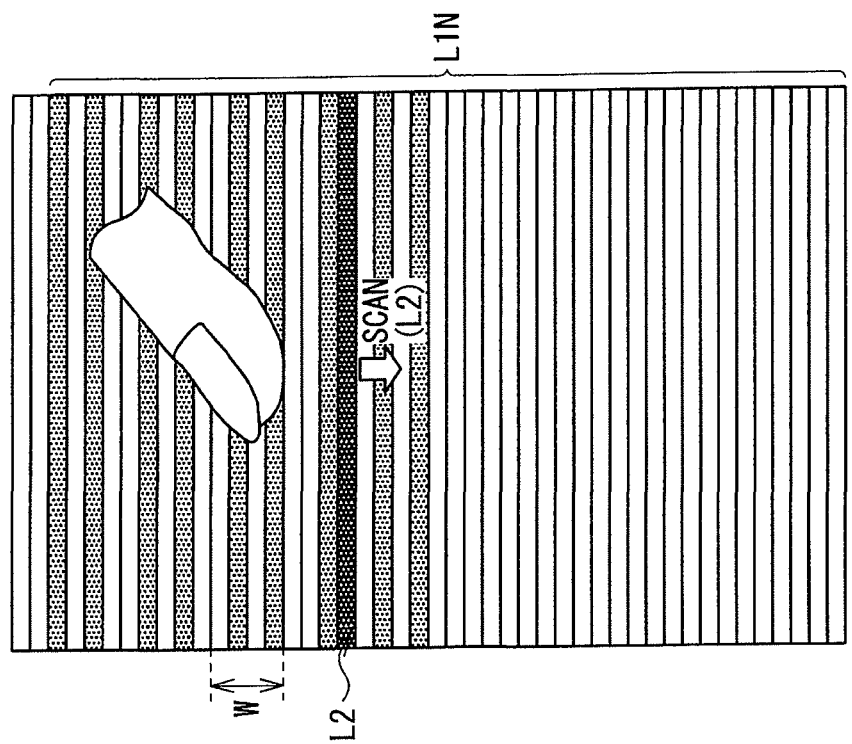
FIGS. 13A and 13B are schematic diagrams showing an example of a selection state of a drive electrode according to a modification of the first embodiment.
Figure 13A:
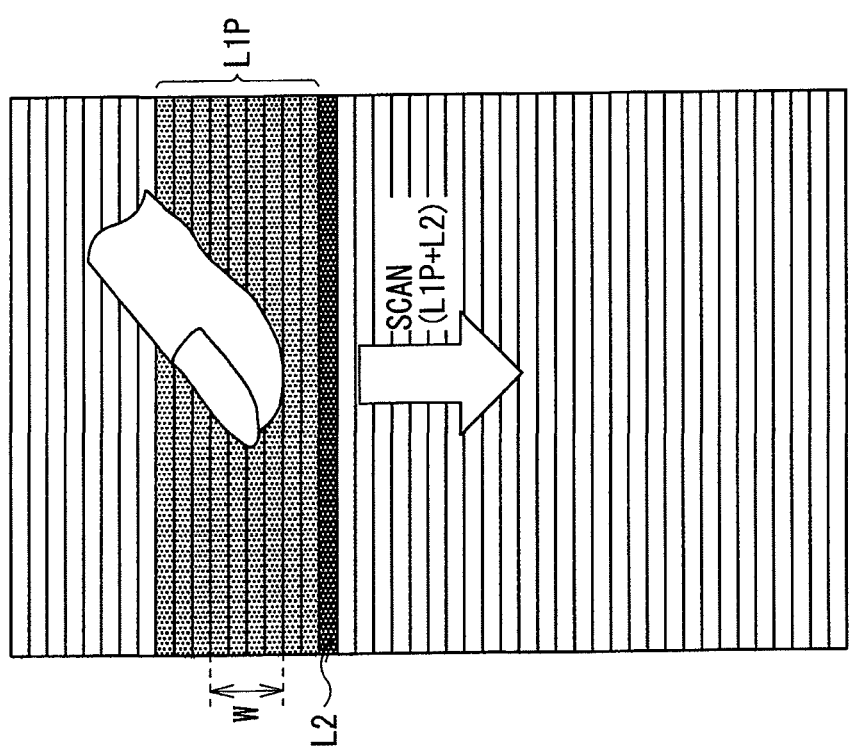
Figures 14A, 14B:
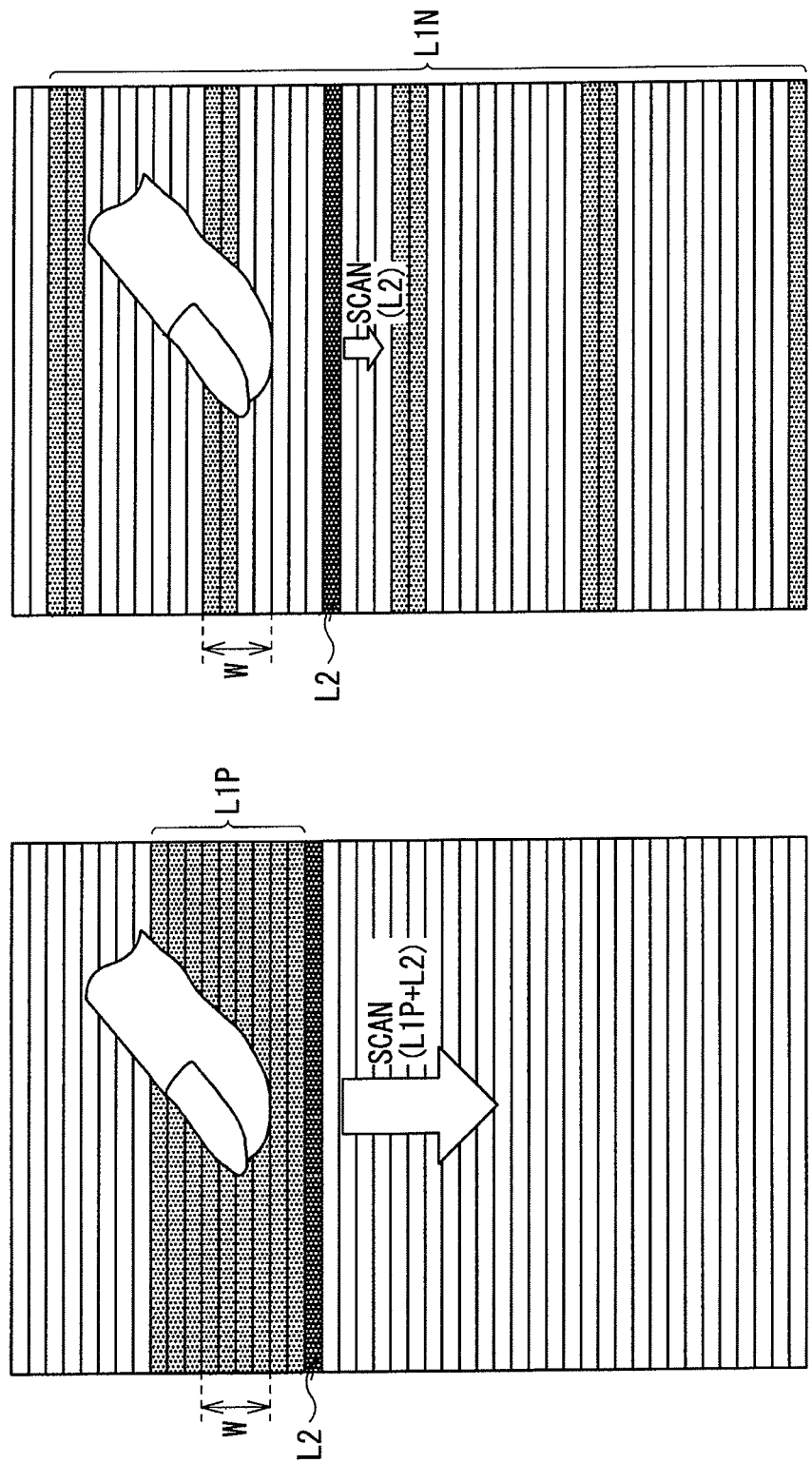
FIGS. 14A and 14B are schematic diagrams showing an example of a selection state of a drive electrode according to another modification of the first embodiment.

In the embodiment, when a voltage of the drive signal Vcom is negative, the detection drive line group L1N is configured of drive electrodes discretely arranged on the whole surface of the touch sensor 441. However, this is not limitative, and may be appropriately modified as long as the following condition is satisfied: wherever a proximity object such as a finger is on the touch sensor 441, width (number of drive electrodes) of a strip region overlapping with the proximity object in the detection drive line group L1N is smaller than width (number of drive electrodes) of a strip region overlapping with the proximity object in the detection drive line group UP. For example, as shown in FIGS. 13A and 13B, when a voltage of the drive signal Vcom is negative (low level), the drive electrodes of the detection drive line group L1N may be discretely located only in an upper-half region of the touch sensor 441. Alternatively, for example, as shown in FIGS. 14A and 14B, thin strip electrode portions including a plurality of drive electrodes adjacent to one another may be dispersed over the whole panel or a partial region of the panel instead of dispersing the drive electrodes one by one.

Modification 1-3

While the detection drive line group L1N applied with a negative voltage of the drive signal Vcom is not scan-moved in a vertical direction in the embodiment, the group may be scan-moved in the direction.

3. Second Embodiment

Next, a display apparatus with a touch detection function according to a second embodiment of the invention is described. Substantially the same components as those of the display apparatus with a touch detection function according to the first embodiment are marked with the same reference numerals or signs, and appropriately omitted to be described.

Configuration Example

General Configuration Example

Figure 15:
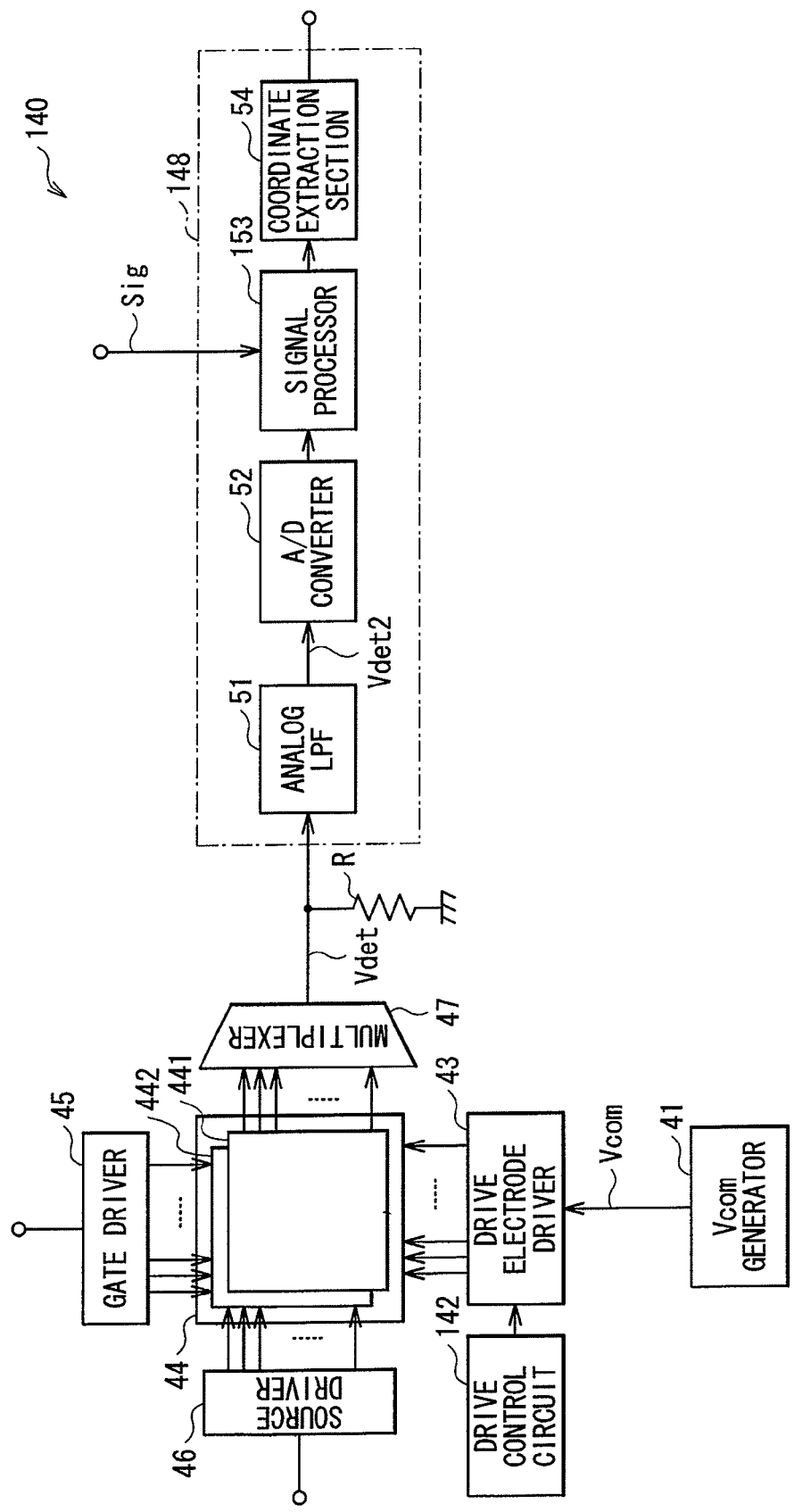
FIG. 15 is a block diagram showing a configuration example of a display apparatus with a touch detection function according to a second embodiment of the invention.

FIG. 15 shows a configuration example of a display apparatus with a touch detection function 140 according to the embodiment.

The display apparatus with a touch detection function 140 includes a Vcom generator 41, a drive control circuit 142, a drive electrode driver 43, a display device with a touch detection function 44, a gate driver 45, a source driver 46, a multiplexer 47, a detection circuit 148, and a resistance R.

The drive control circuit 142 selects and controls an electrode from a plurality of drive electrodes of the display device 44 when a drive signal Vcom is supplied from the Vcom generator 41 and then supplied to the electrodes. At that time, the drive control circuit 142 may control a layout, number and scan-operation of drive electrodes to be applied with the drive signal Vcom depending on polarity (positive or negative polarity) of the drive signal Vcom. In particular, the drive electrode control section 142 of the embodiment performs control such that the drive signal Vcom is applied to the drive electrodes only in a positive range of the drive signal Vcom as will be described later.

The detection circuit 148 detects presence of touch to the touch sensor 441 based on a detection signal Vdet switched by the multiplexer 47, and furthermore obtains coordinates of the touch on a touch panel. The detection circuit 148 includes analog LPF (Low-Pass Filter) 51, an A/D converter 52, a signal processor 153, and a coordinate extraction section 54. The signal processor 153 is a logic circuit detecting presence of touch to the touch sensor 441 based on an image signal Sig inputted from the outside.

These circuits are controlled by a not-shown timing controller.

Operation and Effects

Operation Example of Drive Control Circuit 142

The drive control circuit 142 selects a drive electrode, to which the drive signal Vcom is applied by the drive electrode driver 43, from the drive electrodes 33 of the display device 44 with a touch detection function. Such selection is separately performed for the touch sensor 441 and for the liquid crystal display device 442.

Figure 16B:
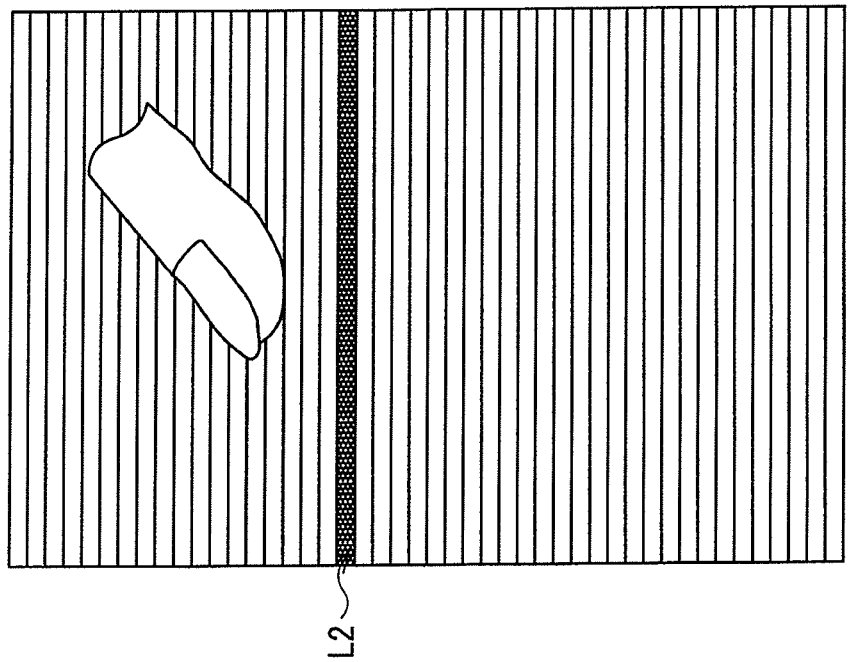
FIGS. 16A and 16B are schematic diagrams showing an example of a selection state of a drive electrode according to a display device with a touch detection function shown in FIG. 15.
Figure 16A:
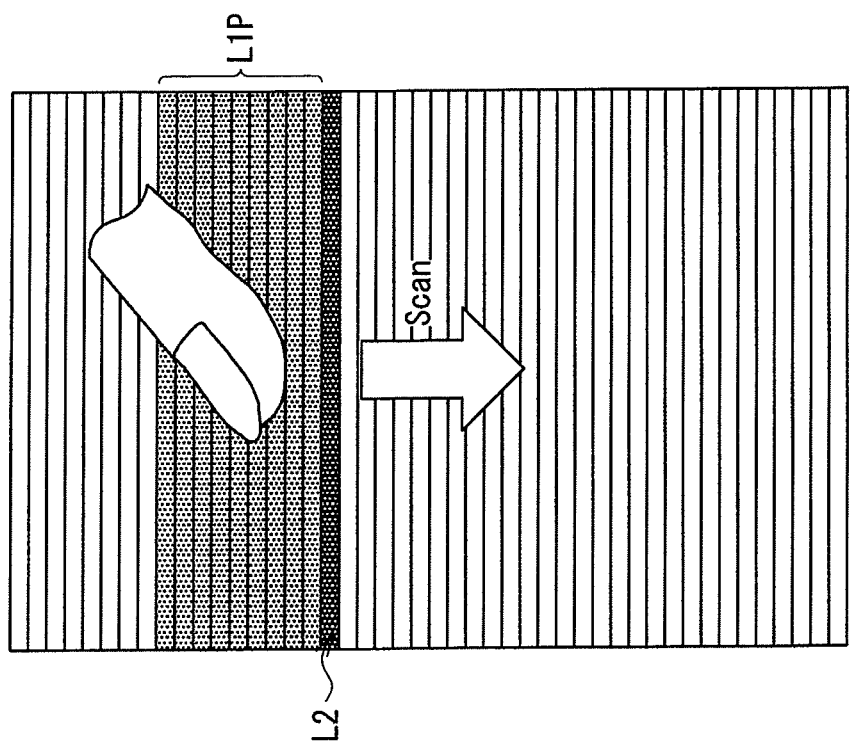

FIGS. 16A and 16B show an operation example of a drive electrode applied with the drive signal Vcom, where FIG. 16A shows an operation example when a voltage of the drive signal Vcom has a high level, and FIG. 16B shows an operation example when a voltage of the drive signal Vcom has a low level, as an operation example immediately after operation of FIG. 16A.

In FIGS. 16A and 16B, a drive electrode applied with a drive signal Vcom used for driving the touch sensor 441 is only in a detection drive line group L1P (first group) applied with a first voltage in a positive range. That is, any drive electrode is not used for driving the touch sensor 441. On the other hand, a drive electrode applied with a drive signal Vcom used for driving the liquid crystal display device 442 includes a single display drive line L2 in each of the positive and negative ranges. Operation of the display drive line L2 is the same as in the first embodiment.

In drive of the touch sensor 441, as shown in FIGS. 16A and 16B, number of drive electrodes applied with the drive signal Vcom or a layout pattern thereof is different depending on polarity ranges of the drive signal Vcom. Specifically, in the positive range of the drive signal Vcom, as shown in FIG. 16A, the detection drive line group UP forming a single, thick strip drive electrode is selected, and applied with a positive voltage (first voltage). The single strip drive electrode is sequentially scan-moved by one horizontal pixel line in synchronization with the display drive line L2. Such scan is performed to detect a position where a finger contacts or approaches the touch sensor 441. In contrast, in the negative range of the drive signal Vcom, as shown in FIG. 16B, any drive electrode is not selected, and the touch sensor 441 is not driven.

Operation Example of Touch Sensor 441

Next, operation example of the touch sensor 441 is described in more detail.

Figure 17:
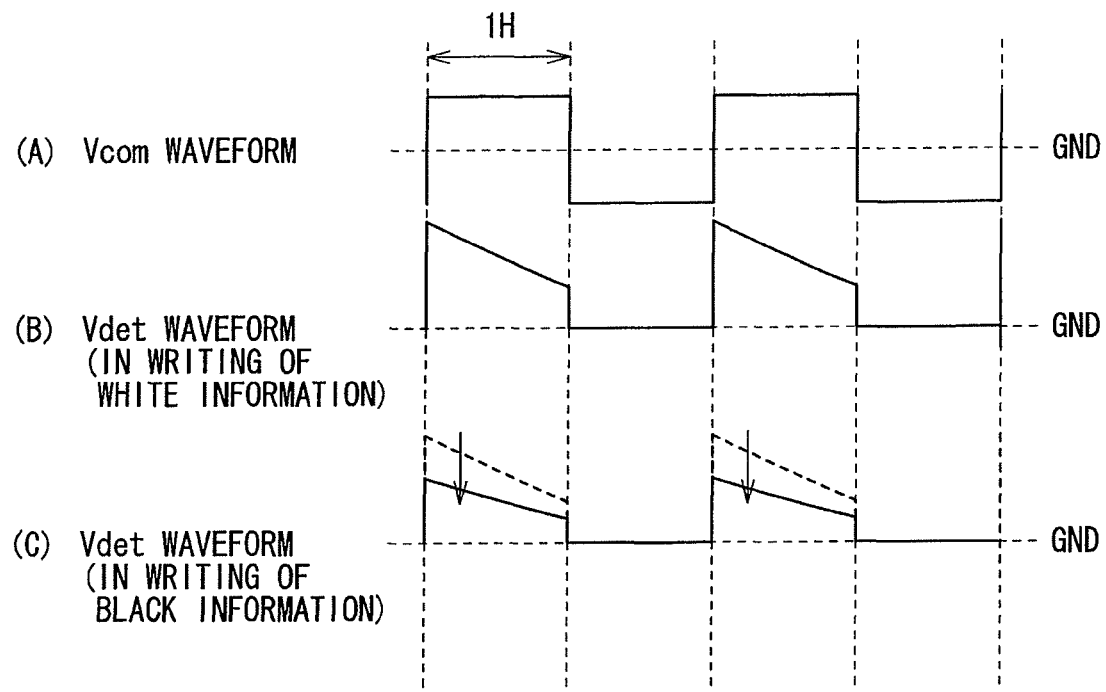
FIG. 17 is a chart showing an example of timing in the display apparatus with a touch detection function shown in FIG. 15.

FIG. 17 shows an example of timing in the display apparatus with a touch detection function 140, where part A in FIG. 17 shows a waveform of the drive signal Vcom, part B in FIG. 17 shows a waveform of the detection signal Vdet in the case that touch operation is not performed, and part C in FIG. 17 shows a waveform of the detection signal Vdet in the case that touch operation is performed.

(1) Operation in the Case without Internal Noise

As shown in part B in FIG. 17, in the case that touch operation is not performed, a waveform of the detection signal Vdet is a positive-negative asymmetrical signal waveform while being in synchronization with polarity alternation of the drive signal Vcom unlike that of part B in FIG. 9 in the first embodiment. This is because the detection drive line group is configured only in the positive range of the drive signal Vcom as shown in FIGS. 16A and 16B. That is, when a particular touch detection electrode is noticed, since capacitance is formed in an intersecting part between the touch detection electrode and the detection drive line group L1P only in the positive range of the drive signal Vcom, a waveform appears in accordance with the principle of capacitance-type touch detection only in the positive range.

Furthermore, as shown in part C in FIG. 17, in the case that touch operation is performed, a waveform of the detection signal Vdet is a positive-negative asymmetrical signal waveform while being in synchronization with polarity alternation of the drive signal Vcom. This is because the detection drive line group is configured only in the positive range of the drive signal Vcom as in the case of part B in FIG. 17.

In the state where touch operation is performed, a time-average level of the detection signal Vdet is shifted to a low voltage side (negative side) compared with the case that touch operation is not performed. Since frequency of occurrence of a section shifted to the low voltage side is sufficiently low, and the frequency directly passes through the analog LPF, only such a low-frequency component may be extracted, and presence of touch operation may be thus detected.

(2) Operation in the Case with Internal Noise

Next, influence of internal noise generated by the liquid crystal display device 442 on the touch sensor 441 is described.

Figure 18:
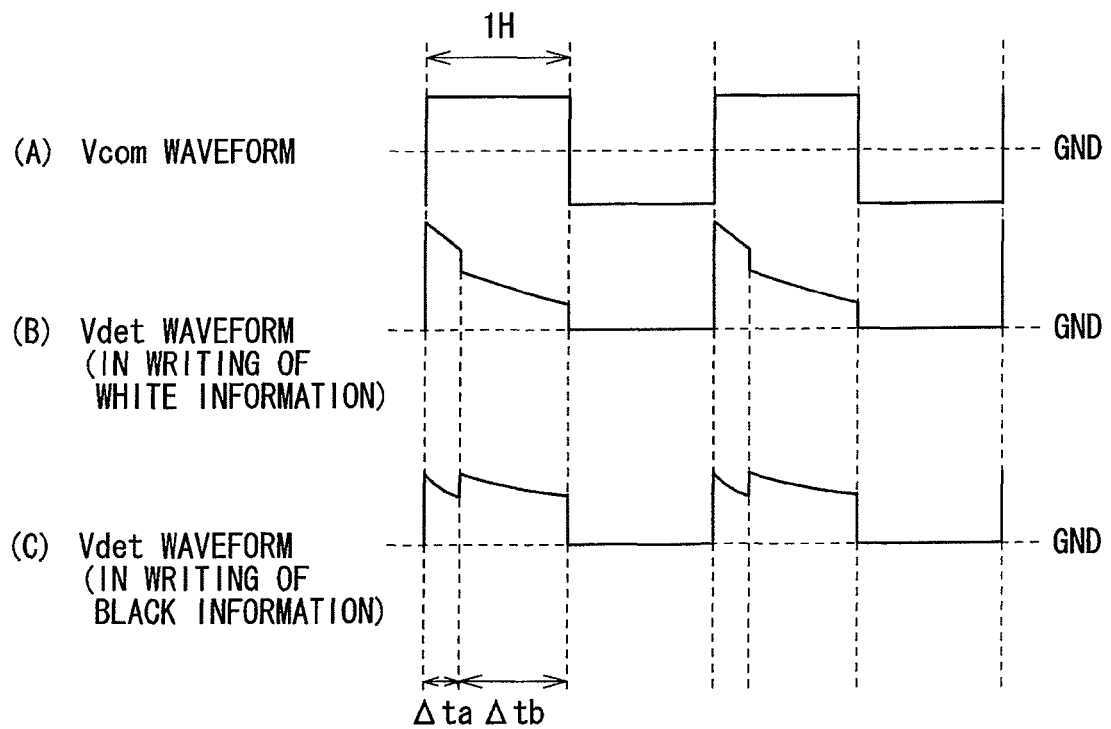
FIG. 18 is a chart showing an example of timing in the case with internal noise when touch operation is not performed in the display apparatus with a touch detection function shown in FIG. 15.

FIG. 18 shows an example of waveforms in the case that touch operation is not performed when internal noise exists, where part A in FIG. 18 shows a waveform of the drive signal Vcom, part B in FIG. 18 shows a waveform of the detection signal Vdet in writing of white information, and part C in FIG. 18 shows a waveform of the detection signal Vdet in writing of black information.

As shown in part B and part C in FIG. 18, when a pixel is written with a signal, internal noise due to the written pixel signal appears in the detection signal Vdet. At that time, magnitude of the internal noise depends on magnitude of the written pixel signal (display luminance or display color). Furthermore, such noise also exists only in the positive range of the drive signal Vcom. This means that a time-average level of the detection signal Vdet is changed depending on a written pixel signal. Therefore, a low-frequency component of the signal directly passes through the analog LPF, and thus internal noise is outputted depending on pixel signals. In this case, such internal noise may not be distinguished from a waveform due to presence of touch operation.

Thus, in the embodiment, as shown in FIG. 15, the signal processor 153 performs signal processing by using an output signal from the A/D converter 52 and an externally inputted image signal Sig. Specifically, amount of internal noise is calculated based on the image signal Sig, and a difference between the output signal from the A/D converter 52 and the calculated amount of internal noise is obtained, thereby the internal noise may be removed so that only presence of touch may be detected. The image signal Sig may be supplied from the outside as shown in the figure, or may be supplied from the source driver 46.

Advantage

As above, in the embodiment, since the drive signal Vcom is applied to the drive electrode only in the positive range of the drive signal Vcom as shown in FIGS. 16A and 16B, the detection signal Vdet from the touch sensor 441 includes a positive-negative asymmetrical signal component (touch component) due to touch operation. Therefore, even if an analog LPF is provided in a stage after the touch sensor, the touch component is not cancelled, and a touch detection signal in correspondence to presence of touch may be extracted.

Furthermore, in the embodiment, since the detection circuit uses the externally inputted image signal Sig for calculation, the positive-negative asymmetrical signal component due to internal noise may be removed.

Modification of Second Embodiment

Modification 2-1

While the detection drive line group L1P is selected as shown in FIG. 16A only in the case that voltage of the drive signal Vcom is positive (high level) in the embodiment, opposite setting may be used. Specifically, the detection drive line group may be selected as shown in FIG. 16A only in the case that voltage of the drive signal Vcom is negative (low level).

Modification 2-2

When a voltage of the drive signal Vcom is negative (low level), the detection drive line is not selected in the embodiment. However, this is not limitative, and the detection drive line group L1N may be formed in such a case. That is, this may be appropriately modified as long as the following condition is satisfied: wherever a proximity object such as a finger is on the touch sensor 441, width (number of drive electrodes) of a strip region overlapping with the proximity object in the detection drive line group L1N is smaller than width (number of drive electrodes) of a strip region overlapping with the proximity object in the detection drive line group L1P. At that time, in each of part B and part C in FIG. 17 and part B and part C in FIG. 18, a pulse appears even on a negative voltage side, and a waveform of the pulse is positive-negative asymmetric. Even in this case, the externally inputted image signal Sig is used for calculation, thereby the internal noise may be removed, and the touch detection signal may be extracted.

4. Application Examples

Next, application examples of the method of driving a touch panel, the capacitance-type touch panel, and the display apparatus with a touch detection function, those being described in the embodiments and the modifications, are described with reference to FIG. 19 to FIG. 23G The method of driving a touch panel, the capacitance-type touch panel, and the display apparatus with a touch detection function according to the embodiments and the like may be applied to electronic devices in any field, including a television apparatus, a digital camera, a notebook personal computer, a mobile terminal such as mobile phone, and a video camera. In other words, the display apparatus according to each of the embodiments and the like may be applied to electronic devices in any field, which displays an externally inputted video signal or internally generated video signal as an image or a picture.

Application Example 1

Figure 19:
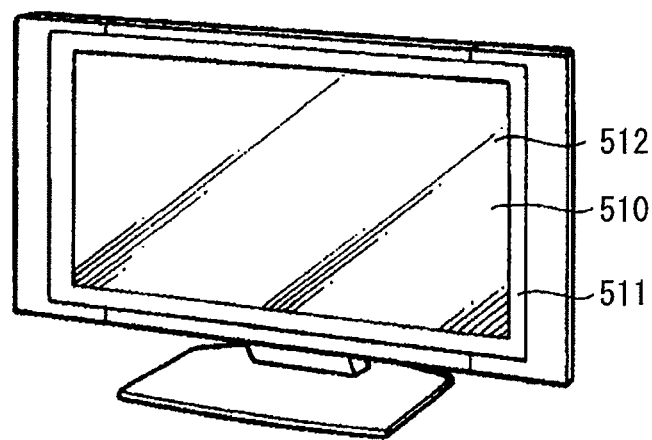
FIG. 19 is a view showing a general configuration of an application example 1 among display apparatuses with a touch detection function each using the embodiments.

FIG. 19 shows appearance of a television apparatus using the display apparatus with a touch detection function according to each of the embodiments and the like. The television apparatus has, for example, a front panel 511 and a video display screen 510 including filter glass 512, and the video display screen 510 is configured of the display apparatus with a touch detection function according to each of the embodiments and the like.

Application Example 2

Figure 20A:
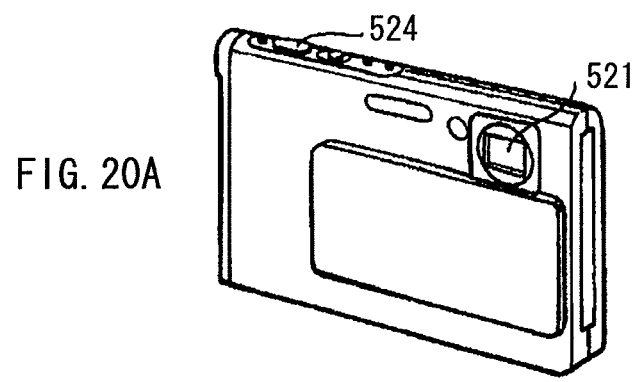
FIGS. 20A and 20B show a general configuration of an application example 2, where
Figure 20B:
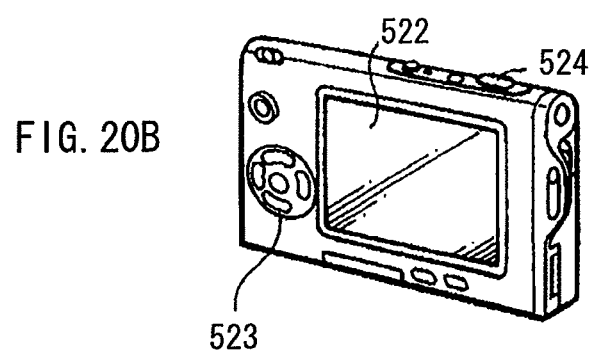

FIGS. 20A and 20B show appearance of a digital camera using the display apparatus with a touch detection function according to each of the embodiments and the like. The digital camera has, for example, a light emitting section for flash 521, a display 522, a menu switch 523 and a shutter button 524, and the display 522 is configured of the display apparatus with a touch detection function according to each of the embodiments and the like.

Application Example 3

Figure 21:
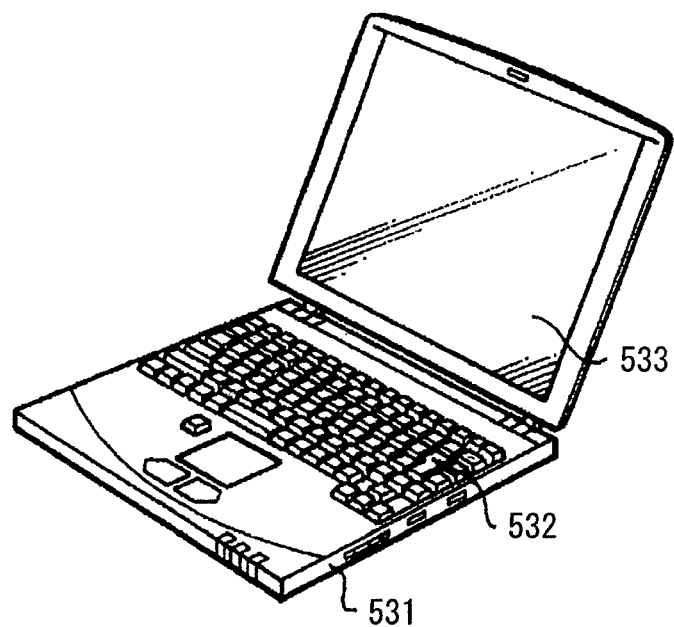
FIG. 21 is a perspective view showing a general configuration of an application example 3.

FIG. 21 shows appearance of a notebook personal computer using the display apparatus with a touch detection function according to each of the embodiments and the like. The notebook personal computer has, for example, a body 531, a keyboard 523 for input operation of letters and the like, and a display 533 for displaying an image, and the display 533 is configured of the display apparatus with a touch detection function according to each of the embodiments and the like.

Application Example 4

Figure 22:
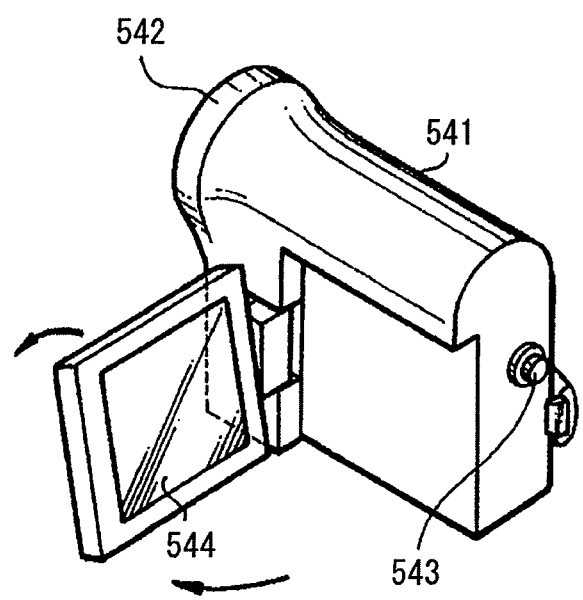
FIG. 22 is a perspective view showing a general configuration of an application example 4.
Figure 23:
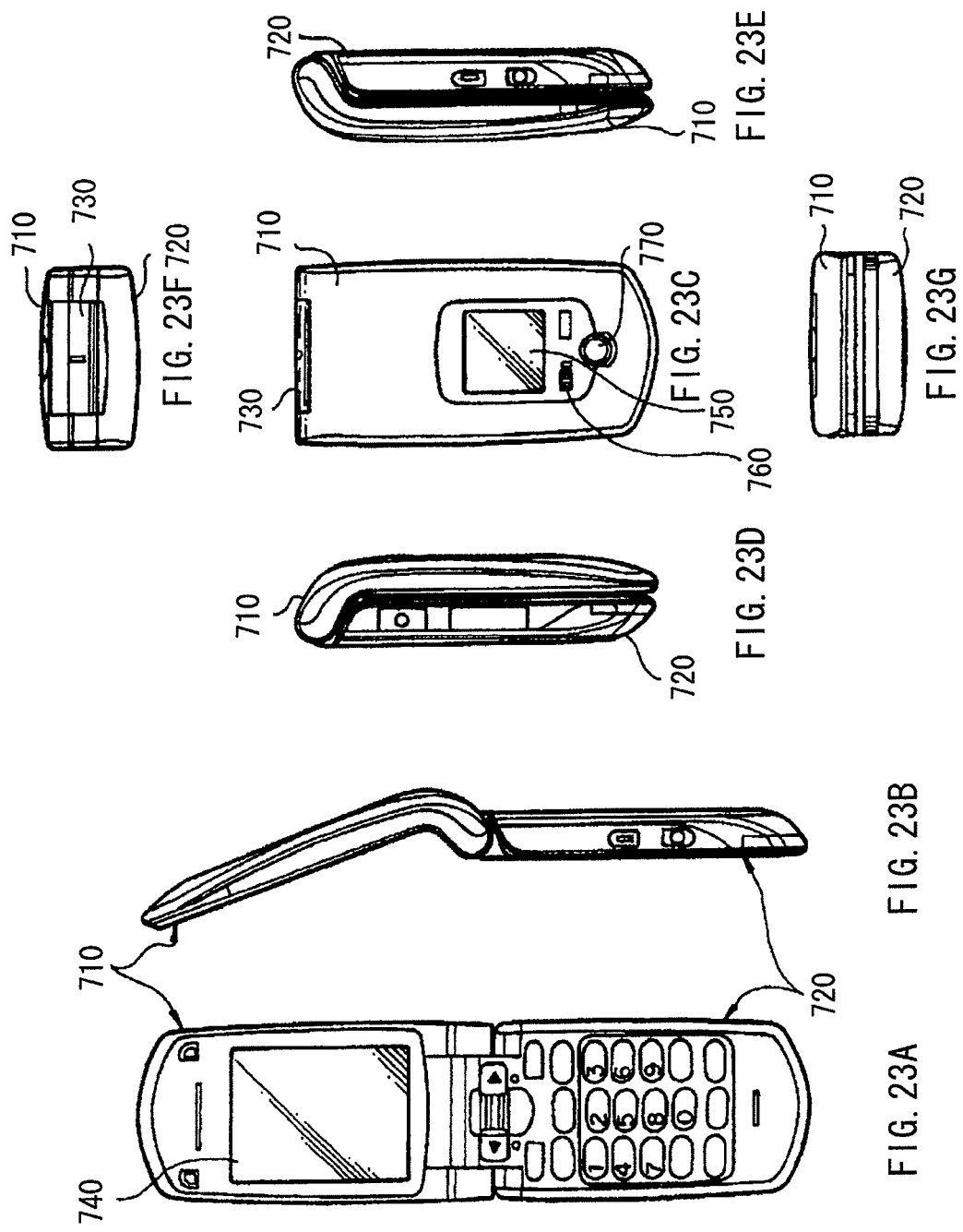
FIGS. 23A to 23G show a general configuration of an application example 5, where

FIG. 22 shows appearance of a video camera using the display apparatus with a touch detection function according to each of the embodiments and the like. The video camera has, for example, a body 541, a lens 542 for shooting an object provided on front side-face of the body 541, and a start/stop switch 543 used in shooting, and a display 544. The display 544 is configured of the display apparatus with a touch detection function according to each of the embodiments and the like.

Application Example 5

FIGS. 23A to 23G show appearance of a mobile phone using the display apparatus with a touch detection function according to each of the embodiments and the like. For example, the mobile phone is formed by connecting an upper housing 710 to a lower housing 720 by a hinge 730, and has a display 740, sub display 750, a picture light 760, and a camera 770. The display 740 or the sub display 750 is configured of the display apparatus with a touch detection function according to each of the embodiments and the like.

5. Other Modifications

While the invention has been described with several embodiments and modifications thereof hereinbefore, the invention is not limited to the embodiments and the like, and may be variously modified or altered.

Modification 3-1

For example, while when voltage of the drive signal Vcom is positive (high level), the detection drive line L1P and the display drive line L2 are similarly sequentially scanned in each embodiment, this is not limitative. For example, the detection drive line L1P may be scanned by a plurality of drive electrodes, or randomly scanned.

Modification 3-2

Figure 24:
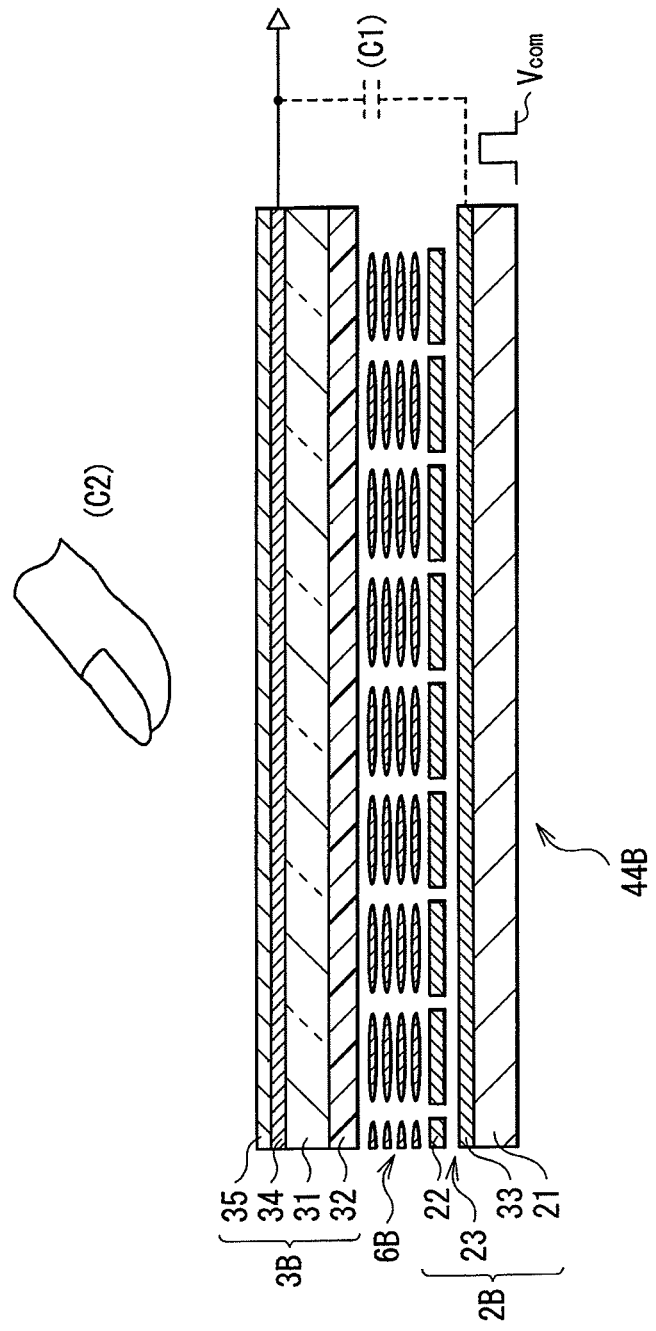
FIG. 24 is a section diagram showing a schematic section structure of a display device with a touch detection function according to a modification of the first and second embodiments.

For example, in each embodiment, the liquid crystal display device 442, which uses liquid crystal in a mode of TN (Twisted Nematic), VA (Vertical Alignment), ECB (Electrically Controlled Birefringence) or the like, and the touch sensor 441 are integrated to configure the display device with a touch detection function 44. However, a liquid crystal display device using liquid crystal in a transverse electric field mode such as FFS (Fringe Field Switching) mode or IPS (In-Plane Switching) mode and a touch sensor may be integrated with a touch sensor instead. For example, in the case of using liquid crystal in a transverse electric field mode, a display device with a touch detection function 44B may be configured as shown in FIG. 24. The figure shows an example of a relevant-part section structure of the display device with a touch detection function 44B, showing a state where a liquid crystal layer 6B is sandwiched between a pixel substrate 2B and a counter substrate 3B. Names or functions of other sections are the same as in the case of FIG. 5, and therefore omitted to be described. In this example, unlike the case of FIG. 5, a drive electrode 33 commonly used for display and for touch detection is formed immediately above a TFT substrate 21, and configures part of the pixel substrate 2B. Pixel electrodes 22 are disposed above the drive electrode 33 with an insulating layer 23 in between. In this case, all dielectrics including the liquid crystal layer 6B between the drive electrode 33 and a touch detection electrode 34 contributes to formation of capacitance C1.

Modification 3-3

Figure 25:
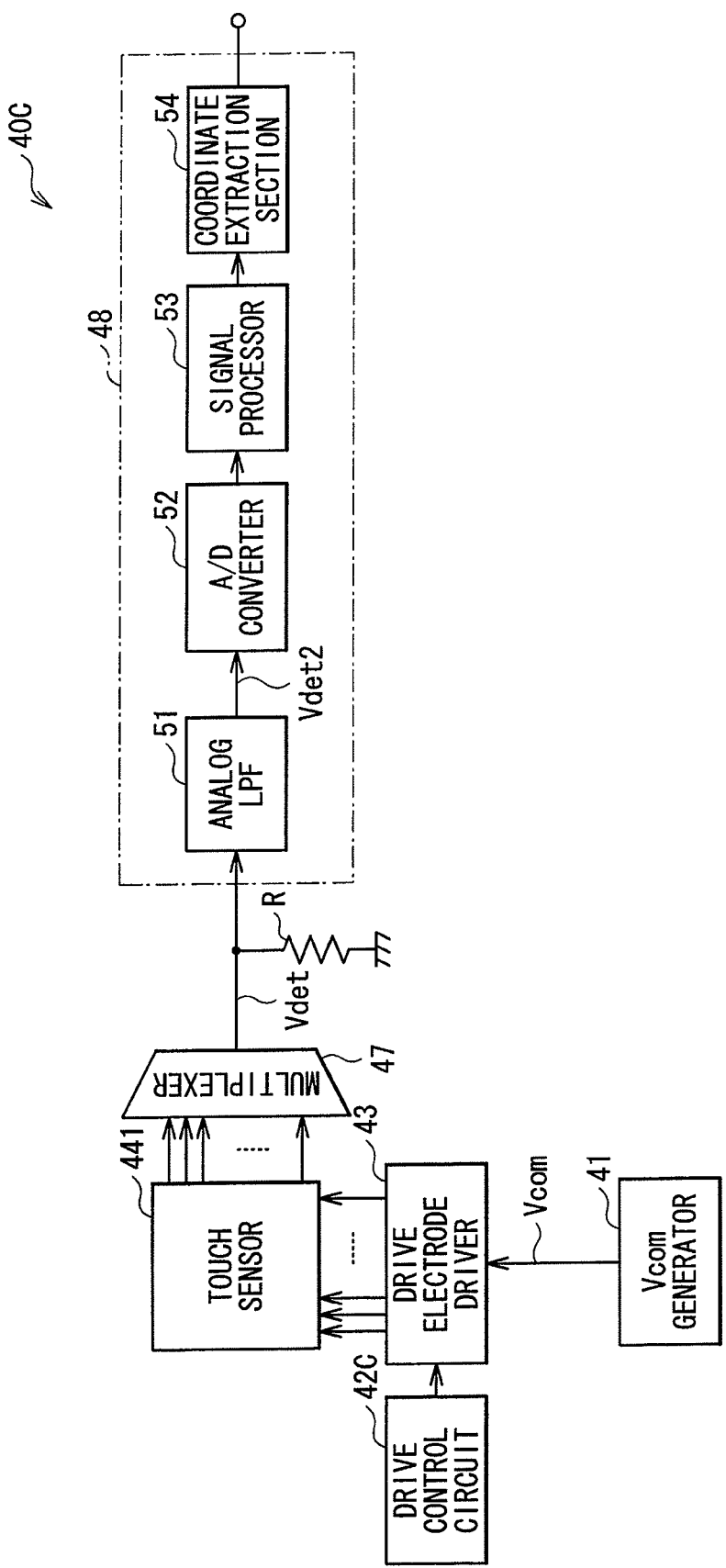
FIG. 25 is a block diagram showing a configuration example of a touch panel according to a modification of the first embodiment.

Furthermore, for example, while the liquid crystal display device 442 and the touch sensor 441 are integrated in each embodiment, the device and the sensor may not be integrated. FIG. 25 shows a configuration example of a capacitance-type touch panel 40C in the case that the first embodiment is modified in such a way.

The capacitance-type touch panel 40C includes a Vcom generator 41, a drive control circuit 42C, a drive electrode driver 43, a touch sensor 441, a multiplexer 47, a detection circuit 48, and a resistance R. In the modification, the drive control circuit 42C controls the drive electrode driver 43 to generate only detection drive lines L1P and L1N. In addition, a drive signal Vcom is used only in the touch sensor 441, internal noise is not generated. Other operation is the same as in the first embodiment.

The present application contains subject matter related to that disclosed in Japanese Priority Patent Application JP 2009-154207 filed in the Japan Patent Office on Jun. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A capacitance-type touch panel comprising:
a plurality of drive electrodes each having a strip shape;
a drive control circuit performing control such that a drive signal for touch detection is selectively applied to the drive electrodes;
a plurality of touch detection electrodes arranged to intersect with the drive electrodes in such a manner that capacitance is formed in each intersecting part, and each outputting a detection signal in synchronization with the drive signal; and
a detection circuit detecting an external proximity object based on the detection signal,
wherein the drive control circuit controls application of the drive signal such that a positive drive signal is selectively applied to predetermined regions of the display in a first period;
a negative drive signal is applied to predetermined regions of the display in a second period different from the first period so that there is a difference in surface area of the drive electrodes receiving the positive and negative drive signals for contact detection thereby causing a time-average level of the detection signal both in the first period and the second period to be shifted with respect to a center voltage of the detection signal when a portion of the display is contacted or approached due to a difference in capacitance between the first period and the second period; and
the detection circuit detects the external proximity object based on a shift of the time-average level of the detection signal both in the first period and the second period with respect to the center voltage of the detection signal.

2. The capacitance-type touch panel according to claim 1, wherein the drive signal is a signal having a periodical waveform including a period of a first voltage and a period of second voltage different from the first voltage,
the drive control circuit selects a first group of drive electrodes and a second group of drive electrodes from the plurality of drive electrodes in such a manner that, a total width of drive electrodes, belonging to the first group of drive electrodes, within a base width corresponding to size of the external proximity object is different from a total width of drive electrodes, belonging to the second group of drive electrodes, within the base width, at any position in a region where the drive electrodes are arranged, and then applies the first voltage and the second voltage of the drive signal to the selected drive electrodes of the first and second groups, respectively.

3. The capacitance-type touch panel according to claim 2, wherein the drive control circuit selects the first group of drive electrodes in such a manner that the first group of drive electrodes configures a single strip region which shifts in a manner of time-divisional scanning.

4. The capacitance-type touch panel according to claim 2, wherein the drive control circuit selects the second group of drive electrodes in such a manner that the second group of drive electrodes are divided into a plurality of sub groups discretely arranged.

5. The capacitance-type touch panel according to claim 1, wherein the drive control circuit selects the first group of drive electrodes and the second group of drive electrodes in such a manner that a total width of all drive electrodes belonging to the first group is equal to a total width of all drive electrodes belonging to the second group.

6. The capacitance-type touch panel according to claim 1, wherein the drive signal is a signal having a periodical waveform including a period of a first voltage and a period of second voltage different from the first voltage, and
the drive control circuit selects a group of drive electrodes configuring a single strip region from the plurality of drive electrodes, and controls application of the drive signal in such a manner that the first voltage of the drive signal is applied to the group of drive electrodes, and that a second voltage is not applied to any drive electrode.

7. The capacitance-type touch panel according to claim 1, wherein the detection circuit has an analog filter performing high-band cutoff for cutting a band of frequencies equal to or higher than a predetermined frequency.

8. A display apparatus with a touch detection function comprising:
a plurality of drive electrodes each having a strip shape;
a drive control circuit performing control such that a drive signal for touch detection is selectively applied to the drive electrodes;
a plurality of touch detection electrodes arranged to intersect with the drive electrodes in such a manner that capacitance is formed in each intersecting part, and each outputting a detection signal in synchronization with the drive signal;
a detection circuit detecting an external proximity object based on the detection signal; and
a display section displaying an image based on an image signal, wherein the drive control circuit controls application of the drive signal such that a positive drive signal is selectively applied to predetermined regions of the display in a first period;
a negative drive signal is applied to predetermined regions of the display in a second period different from the first period so that there is a difference in surface area of the drive electrodes receiving the positive and negative drive signals for contact detection thereby causing a time-average level of the detection signal both in the first period and the second period to be shifted with respect to a center voltage of the detection signal when a portion of the display is contacted or approached due to a difference in capacitance between the first period and the second period; and
the detection circuit detects the external proximity object based on a shift of the time-average level of the detection signal both in the first period and the second period with respect to the center voltage of the detection signal.

9. The display apparatus with a touch detection function according to claim 8, wherein
the display section is configured with liquid crystal elements, and
the drive signal for touch detection also serves as part of a display drive signal for driving the display.

10. The display apparatus with a touch detection function according to claim 9, wherein
the display drive signal includes a pixel signal based on the image signal and a common drive signal,
the display section performs display operation by means of polarity-inversion driving where a polarity of an application voltage which is defined by the pixel signal and the common drive signal and is applied to each of the liquid crystal elements is time-divisionally inverted, and
the drive signal for touch detection also serves as the common drive signal.

11. The display apparatus with a touch detection function according to claim 8, wherein
a positive-negative asymmetric variation appearing in the detection signal associated with drive of the display section is compensated based on the image signal.

12. The display apparatus with a touch detection function according to claim 8, wherein
the drive signal is a signal having a periodical waveform including a period of a first voltage and a period of second voltage different from the first voltage, and
the drive control circuit selects a group of drive electrodes configuring a strip region from the plurality of drive electrodes, and controls application of the drive signal such that the first voltage of the drive signal is applied to the group of drive electrodes, and a second voltage is not applied to any drive electrode.

13. The display apparatus with a touch detection function according to claim 8, wherein
the detection circuit performs compensation for a variation due to display noise through eliminating a positive-negative asymmetric display noise component from the detection signal based on the image signal, the display noise component appearing in the detection signal associated with drive of the display section.

14. A method of driving a touch panel, comprising steps of:
selectively applying a drive signal for touch detection to a plurality of drive electrodes each having a strip shape;
allowing each of a plurality of touch detection electrodes to output a detection signal in synchronization with the drive signal when an external proximity object exists, the touch detection electrodes being arranged to intersect with the drive electrodes in such a manner that capacitance is formed in each intersecting part, and the detection signal being applied such that a positive drive signal is selectively applied to predetermined regions of the display in a first period and a negative drive signal is applied to predetermined regions of the display in a second period different from the first period so that there is a difference in surface area of the drive electrodes receiving the positive and negative drive signals for contact detection thereby causing a time-average level of the detection signal both in the first period and the second period to be shifted with respect to a center voltage of the detection signal when a portion of the display is contacted or approached due to a difference in capacitance between the first period and the second period; and detecting the external proximity object based a shift of the time-average level of the detection signal both in the first period and the second period with respect to the center voltage of the detection signal.

* * * * *